United States Patent
Wang et al.

(10) Patent No.: US 11,757,586 B2
(45) Date of Patent: Sep. 12, 2023

(54) WIRELESS COMMUNICATION METHOD AND USER EQUIPMENT FOR RECEIVING INFORMATION AND PERFORMING FEEDBACK

(71) Applicant: NTT DOCOMO, INC., Tokyo (JP)

(72) Inventors: Jing Wang, Beijing (CN); Xiaolin Hou, Beijing (CN); Xin Wang, Beijing (CN); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/267,372

(22) PCT Filed: Aug. 10, 2018

(86) PCT No.: PCT/CN2018/100081
§ 371 (c)(1),
(2) Date: Feb. 9, 2021

(87) PCT Pub. No.: WO2020/029293
PCT Pub. Date: Feb. 13, 2020

(65) Prior Publication Data
US 2022/0116167 A1    Apr. 14, 2022

(51) Int. Cl.
*H04B 17/24* (2015.01)
*H04B 17/318* (2015.01)
(Continued)

(52) U.S. Cl.
CPC .......... *H04L 5/0048* (2013.01); *H04B 17/24* (2015.01); *H04B 17/318* (2015.01); *H04L 1/0081* (2013.01); *H04B 17/382* (2015.01)

(58) Field of Classification Search
CPC .... H04B 17/24; H04B 17/309; H04B 17/318; H04B 17/345; H04B 17/382; H04L 1/0081; H04L 5/0048; H04W 24/10
See application file for complete search history.

(56) References Cited

U.S. PATENT DOCUMENTS

| | | | |
|---|---|---|---|
| 2017/0208494 A1* | 7/2017 | Moon | H04L 5/0048 |
| 2018/0115355 A1 | 4/2018 | Nagata et al. | |
| 2020/0068462 A1 | 2/2020 | Zetterberg et al. | |

FOREIGN PATENT DOCUMENTS

| | | |
|---|---|---|
| CN | 106160807 A | 11/2016 |
| CN | 106412942 A | 2/2017 |

(Continued)

OTHER PUBLICATIONS

International Search Report issued in PCT/CN2018/100081 dated Apr. 30, 2019 (5 pages).

(Continued)

*Primary Examiner* — Melvin C Marcelo
*Assistant Examiner* — Natali Pascual Peguero
(74) *Attorney, Agent, or Firm* — Osha Bergman Watanabe & Burton LLP

(57) ABSTRACT

Embodiments of the present invention provide a wireless communication method, a user equipment and a base station. The wireless communication method performed by the user equipment includes: receiving reference signal configuration information transmitted by a base station by using at least one reference signal group, the reference signal configuration information including an identification of at least one reference signal group and measurement configuration information of at least one reference signal group; and feeding back feedback information about channel quality according to the reference signal configuration information.

5 Claims, 13 Drawing Sheets

(51) Int. Cl.
*H04L 1/00* (2006.01)
*H04L 5/00* (2006.01)
H04B 17/382 (2015.01)

(56) References Cited

FOREIGN PATENT DOCUMENTS

| | | | |
|---|---|---|---|
| CN | 108024278 A | 5/2018 | |
| EP | 3536024 B1 * | 1/2021 | ............ H04W 16/28 |
| WO | 2017/196491 A1 | 11/2017 | |
| WO | 2018/084776 A1 | 5/2018 | |

OTHER PUBLICATIONS

Office Action issued in Chinese Application No. 201880096554.2 dated Sep. 2, 2022 (10 pages).

\* cited by examiner

Base station 10　　　　UE 20　　　　　　Base station 10　　　　UE 20
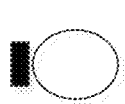  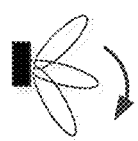 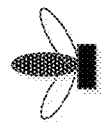
 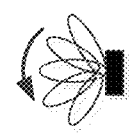 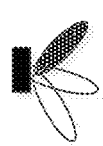 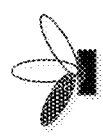
　　　　FIG. 8 (a)　　　　　　　　　　　　FIG. 8 (c)
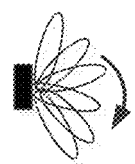   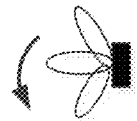
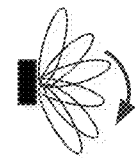   
　　　　FIG. 8 (b)　　　　　　　　　　　　FIG. 8 (d)

Base station 10     UE 20
 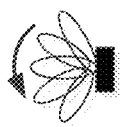
FIG. 9 (a)
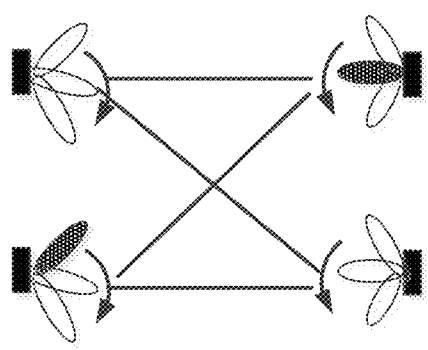
FIG. 9 (c)
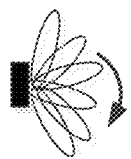 
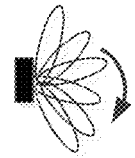 
FIG. 9 (b)
FIG. 9 (d)

```
                                                        1000
        ┌─────────────────────────────────────────────┐
        │  Receiving beam configuration information   │
        │  transmitted by a base station using at least one │
        │  transmitting beam group, where the beam    │
        │  configuration information includes an identification │─S1001
        │  of the at least one transmitting beam group and │
        │  measurement configuration information of the at │
        │  least one transmitting beam group          │
        └─────────────────────────────────────────────┘
                              │
                              ▼
        ┌─────────────────────────────────────────────┐
        │  Feeding back the feedback information about the │─S1002
        │  channel quality according to the beam configuration │
        │  information                                │
        └─────────────────────────────────────────────┘
```

FIG. 10

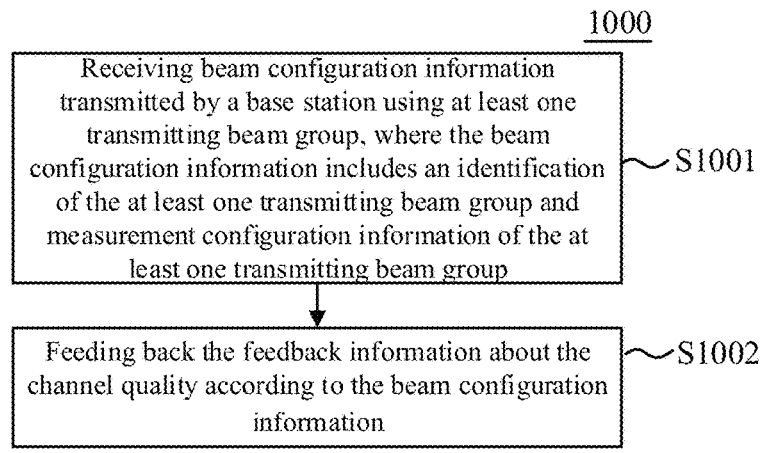

FIG. 11

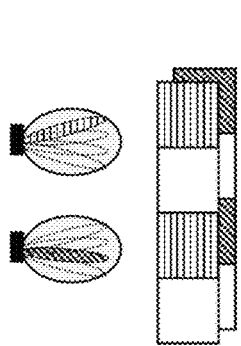  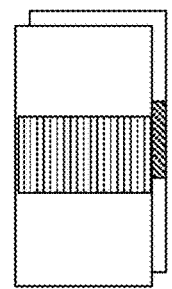 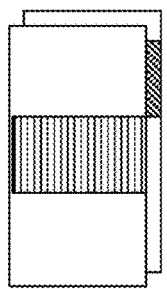
FIG. 14 (a)  FIG. 14 (b)  FIG. 14 (c)  FIG. 14 (d)
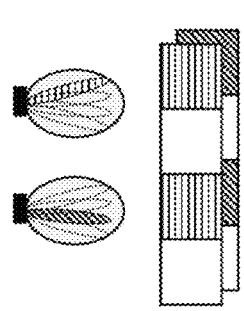  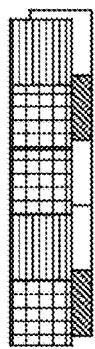 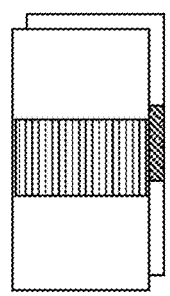
FIG. 15 (a)  FIG. 15 (b)  FIG. 15 (c)  FIG. 15 (d)
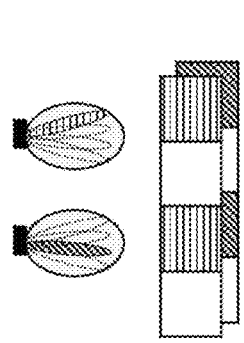  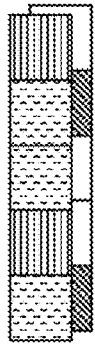 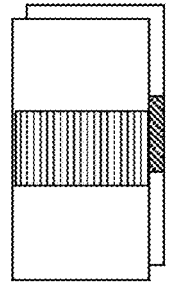
FIG. 16 (a)  FIG. 16 (b)  FIG. 16 (c)  FIG. 16 (d)

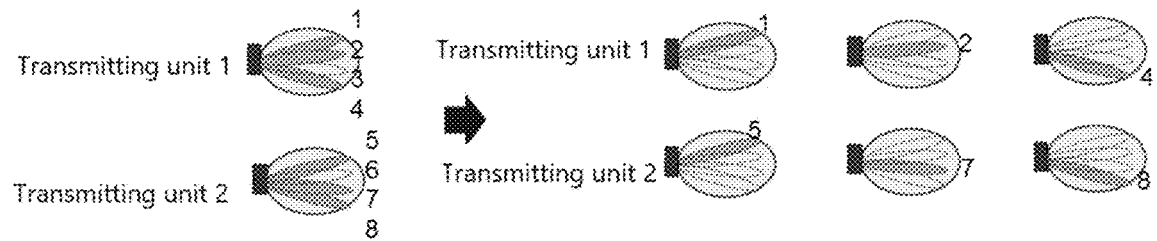
FIG. 20 (a)　　　　　　　　　　FIG. 20 (b)
| L1-RSRP | | Base station: transmitting unit 1 | | | | Base station: transmitting unit 2 | | | |
|---|---|---|---|---|---|---|---|---|---|
| | | Transmitting unit 1 | Transmitting unit 2 | Transmitting unit 3 | Transmitting unit 4 | Transmitting unit 5 | Transmitting unit 6 | Transmitting unit 7 | Transmitting unit 8 |
| UE: Receiving unit 1 | Receiving unit 1 | -50 | -81 | -83 | -80 | -80 | -70 | -80 | -81 |
| | Receiving unit 2 | -80 | -55 | -82 | -80 | -81 | -73 | -90 | -80 |
| UE: Receiving unit 2 | Receiving unit 3 | -80 | -80 | -79 | -55 | -80 | -71 | -80 | -87 |
| | Receiving unit 4 | -75 | -83 | -70 | -77 | -82 | -53 | -88 | -90 |
FIG. 21 (a)
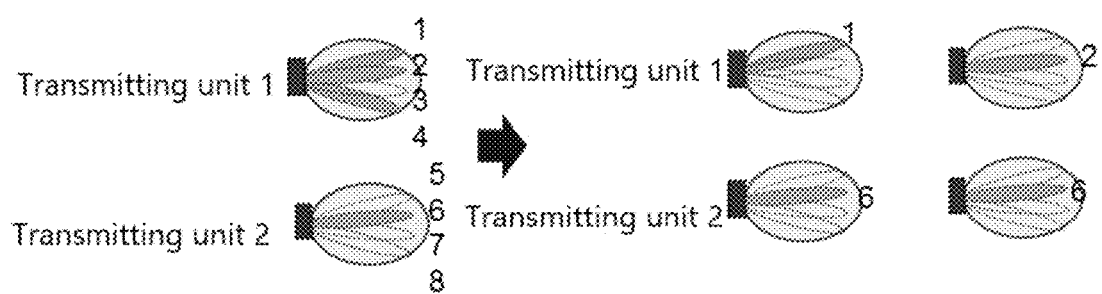
FIG. 21 (b)　　　　　　　　　FIG. 21 (c)

WIRELESS COMMUNICATION METHOD AND USER EQUIPMENT FOR RECEIVING INFORMATION AND PERFORMING FEEDBACK

TECHNICAL FIELD

The present application relates to a field of wireless communication, and in particular, to a wireless communication method, a user equipment, and a base station that may be used in a wireless communication system.

BACKGROUND

In 5G scenarios, especially in 5G high-frequency scenarios, or in scenarios where user equipment (UE) is connected to 5G base stations and/or long-term evolution (LTE) base stations through dual connectivity, it is proposed to use beamforming technology in the base station and the UE, that is, both the base station and the UE may use one or more beams to transmit and receive information. Further, in a scenario where both the base station and the UE include one or more transceiver panels, each transceiver panel may respectively carry one or more transceiver units (TXRUs) to transmit and receive information, and each transceiver unit may also form one or more beams. However, in the above scenarios, once the directional beam transmitted by the base station deviates from the direction of the user equipment, the user equipment cannot receive a high-quality wireless signal.

Therefore, it is expected that when the base station and the UE select beams corresponding to different transceiver units and formed beam groups, signaling interaction is performed between the base station and the UE, so as to improve a transmission quality of a wireless communication system, optimize the configuration of channel transmission resources, and reduce resource overhead according to the aforementioned beam selection and signaling interaction.

SUMMARY OF THE INVENTION

According to an aspect of the present invention, a wireless communication method is provided, which is performed by a user equipment and includes: receiving beam configuration information transmitted by a base station using at least one transmitting beam group, where the beam configuration information includes an identification of the at least one transmitting beam group and measurement configuration information of the at least one transmitting beam group; and feeding back the channel quality feedback information according to the beam configuration information.

According to another aspect of the present invention, a wireless communication method is provided, which is performed by a base station and includes: transmitting beam configuration information by using at least one transmitting beam group, where the beam configuration information includes an identification of at least one transmitting beam group and measurement configuration information of at least one transmitting beam group; and receiving feedback information on channel quality fed back by the user equipment according to the beam configuration information.

According to another aspect of the present invention, a wireless communication method is provided, which is performed by a user equipment and includes: receiving information about a transmitting unit transmitted by a base station, the information about the transmitting unit indicating an identification of at least one transmitting unit and configuration information of a reference signal possessed by the at least one transmitting unit; and selecting one or more reference signals in the at least one transmitting unit according to the information about the transmitting unit, and feeding back reference signal selection information indicating a user equipment selection result.

According to another aspect of the present invention, a wireless communication method is provided, which is performed by a user equipment and includes: receiving feedback indication information transmitted by a base station, and selecting, according to the feedback indication information, a reference signal corresponding to one or more receiving beams in at least one receiving unit of the user equipment; and transmitting reference signal selection information, the reference signal selection information indicating a reference signal selected by the user equipment.

According to another aspect of the present invention, a user equipment is provided, including: a receiving unit configured to receive beam configuration information transmitted by a base station using at least one transmitting beam group, where the beam configuration information includes an identification of the at least one transmitting beam group and measurement configuration information of the at least one transmitting beam group; and a feedback unit configured to feed back the channel quality feedback information according to the beam configuration information.

According to another aspect of the present invention, a base station is provided, including: a transmitting unit configured to transmit beam configuration information by using at least one transmitting beam group, where the beam configuration information includes an identification of at least one transmitting beam group and measurement configuration information of at least one transmitting beam group; and a receiving unit configured to receive feedback information on channel quality fed back by the user equipment according to the beam configuration information.

As described below, since the base station may use different transmitting beams to transmit the corresponding reference signals, the transmitting beams may be used equivalently to the reference signals. Therefore, in the following, the transmitting beams and the reference signals and the transmitting beam group and the reference signal group are used interchangeably.

With the above aspects of the present invention, it is possible to provide a specific signaling interaction scheme between the base station and the UE when selecting corresponding beams and formed beam groups for different transceiver units, so as to improve a transmission quality of a wireless communication system, optimize the configuration of channel transmission resources, and reduce resource overhead according to the signaling interaction and the beam selection process.

BRIEF DESCRIPTION OF THE DRAWINGS

The above and other objects, features and advantages of the present invention will become more apparent by describing embodiments of the present invention in more details with reference to accompanying drawings.

FIG. 8(a) shows a schematic diagram of polling receiving beams on each receiving unit of a UE, FIG. 8(b) shows a schematic diagram of polling transmitting beams on each transmitting unit of a base station, and FIG. 8(c) shows a schematic diagram of polling all transmitting beams among one or more transmitting beams on a certain transmitting unit of a base station 10, and FIG. 8(d) shows a schematic diagram of polling all receiving beams among one or more receiving beams on a certain receiving unit of a UE;

FIG. 9(a) shows a schematic diagram of polling receiving beams on each receiving unit of a UE, FIG. 9(b) shows a schematic diagram of polling transmitting beams on each transmitting unit of a base station, and FIG. 9(c) shows a schematic diagram of polling each pair of transmitting/receiving beam pairs to determine a first transmitting/receiving beam pair, and FIG. 9(d) shows a schematic diagram of determining a second transmitting/receiving beam pair;

FIG. 10 shows a flowchart of a wireless communication method according to an embodiment of the present invention;

FIG. 11 shows a specific content example of CSI resource configuration;

FIG. 14(a) shows an example of intensity measurement of CSI-RS, FIG. 14(b) shows another example of intensity measurement on CSI-RS, and FIG. 14(c) shows an example of intensity measurement on SSB, FIG. 14(d) shows another example of intensity measurement on SSB;

FIG. 15(a) shows an example of reference signal strength and interference strength measurement on CSI-RS, FIG. 15(b) shows another example of reference signal strength and interference strength measurement on CSI-RS, FIG. 15(c) shows yet another example of reference signal strength and interference strength measurement on CSI-RS, and FIG. 15(d) shows an example of reference signal strength and interference strength measurement on SSB;

FIG. 16(a) shows an example of conducting reference signal strength and received signal strength indicator measurement on CSI-RS, FIG. 16(b) shows another example of conducting reference signal strength and received signal strength indicator measurement on CSI-RS, FIG. 16(c) shows yet another example of conducting reference signal strength and received signal strength indicator measurement on CSI-RS, and FIG. 16(d) shows an example of conducting reference signal strength and received signal strength indicator measurement on SSB;

FIG. 17(a) shows a schematic diagram of transmitting beams selected by a base station, FIG. 17(b) shows an example of the base station respectively using the selected transmitting beam group to transmit beam configuration information, and FIG. 17(c) shows another example of the base station respectively using the selected transmitting beam group to transmit beam configuration information;

FIG. 20(a) shows a schematic diagram of transmitting beams selected by a base station, and FIG. 20(b) shows an example of the base station respectively using the selected transmitting beam group to transmit beam configuration information;

FIG. 21(a) shows a schematic diagram of measurement results corresponding to different receiving beams obtained by the UE, FIG. 21(b) shows a schematic diagram of transmitting beams selected by a base station; and FIG. 21(c) shows an example of the base station respectively using the selected transmitting beam group to transmit beam configuration information;

DESCRIPTION OF THE EMBODIMENTS

Figure 1:
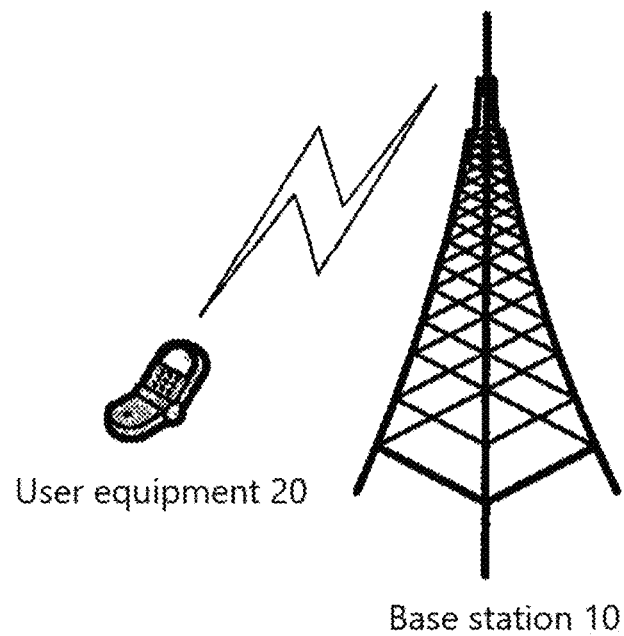
FIG. 1 shows a schematic diagram of a wireless communication system according to an embodiment of the present invention.

A wireless communication method, a user equipment, and a base station according to embodiments of the present invention will be described below with reference to accompanying drawings. Throughout the accompanying drawings, the same reference numerals represent the same elements. It is to be understood that the embodiments described herein are merely illustrative and shall not be construed to limit the scope of the present invention.

First, a wireless communication system according to one embodiment of the present invention will be described with reference to FIG. 1. As shown in FIG. 1, the wireless communication system may include a base station 10 and a user equipment (UE) 20. The UE 20 may communicate with the base station 10. It should be recognized that although one base station and one UE are shown in FIG. 1, this is only schematic, and the wireless communication system may include one or more base stations and one or more UEs.

Figure 2:
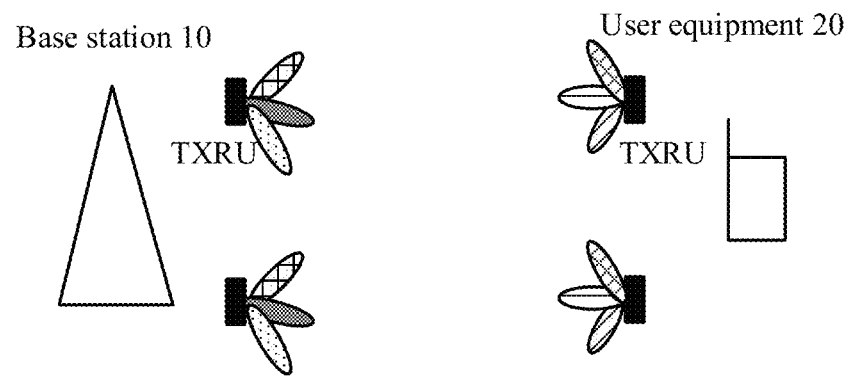
FIG. 2 shows a schematic diagram of beam transmission of a base station and a user equipment in an embodiment of the present invention.

FIG. 2 shows a beam transmission diagram of the base station and the user equipment according to one embodiment of the present invention. The base station 10 may have one or more transmitting/receiving units (TXRU) (two are shown in FIG. 2), and each TXRU may include one or more directional antennas, and accordingly may have one or more transmitting beams, with each directional antenna corresponding to one transmitting beam, so that the base station may use one or more transmitting beams to transmit signals to the UE. In the embodiment of the present invention, the TXRU of the base station 10 may be simply referred to as a transmitting unit. In addition, the UE 20 may also have one or more TXRUs (two are shown in FIG. 2), and each TXRU may also include one or more directional antennas, and accordingly have one or more receiving beams, so that the UE may use one or more receiving beams to receive information transmitted by the base station using one or more beams. In the embodiment of the present invention, the TXRU of the UE 20 may be simply referred to as a receiving unit, for example. One or more receiving beams of the UE 20 may correspond to one or more transmitting beams of the base station 10, so that the UE 20 may use the one or more receiving beams to receive information from the corresponding one or more transmitting beams of the base station 10. It should be noted that although the transmitting unit of the base station mentioned above corresponds to TXRU, this is not restrictive. The transmitting unit of the base station 10 may correspond to the base station (including the transmitting and receiving point (TRP)), the transceiver panel of the base station, TXRU on the transceiver panel of the base station, the radio frequency filter of the base station or the spatial filter of the base station. Similarly, although the receiving unit of the UE mentioned above corresponds to TXRU, this is not restrictive, and the receiving unit of UE 20 may also correspond to the UE, the transceiver panel of the UE, the TXRU of the UE transceiver panel, and the radio frequency filter of the UE or the spatial filter of the UE.

In order to achieve better communication quality, it is desirable to select one or more transmitting beams on the one or more transmitting units of the base station 10 respectively to form a transmitting beam group, and/or to select one or more receiving beams on the one or more receiving units of the UE 20 respectively to form a receiving beam group, and the base station uses the transmitting beam group, and/or the UE uses the receiving beam group to communicate with each other.

A plurality of beam/beam group selection methods may be used to select the transmitting beams/receiving beams. Examples of the beam selection methods according to embodiments of the present invention will be described below with reference to FIGS. 3 to 9.

Figure 3:
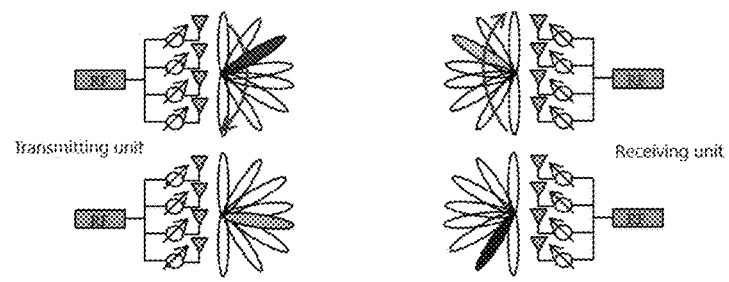
FIG. 3 shows an example of a beam selection method according to an embodiment of the present invention.

In one implementation, beams may be selected by conducting an exhaustive search method on the beam. Specifically, transmitting beams and receiving beams may be respectively selected in order from each transmitting unit of the base station 10 and each receiving unit of the UE 20, and the base station transmits a reference signal to the UE using the selected transmitting beams, and the UE receives the reference signal using the selected receiving beams. Then, according to a preset condition (for example, according to a receiving quality of the reference signal), one transmitting beam is selected from the transmitting beams of each transmitting unit of the base station 10 to form a transmitting beam group of the base station 10, and one receiving beam is selected from the receiving beams of each receiving unit of the UE to form a receiving beam group of the UE 20. FIG. 3 shows an example of this beam selection method. As shown in FIG. 3, in this example, it is assumed that the base station 10 has two transmitting units, and the UE 20 has two receiving units, each transmitting unit has eight transmitting beams, and each receiving unit has eight receiving beams. In other examples, the transmitting unit/transmitting beams and receiving unit/receiving beams may be other numbers, such as one or more, and may be different from each other. One transmitting beam (as shown by the shaded part) may be selected on the two transmitting units of the base station 10 respectively to transmit information (such as the reference signal), and one receive beam (as shown by the shaded part) may be selected on the two receiving units of the UE 20 respectively to receive the information transmitted by the base station 10, so as to obtain parameters (in this example, the parameters may be channel quality measurement results) under this transmission condition. Subsequently, the transmitting beams on one or two transmitting units or the receiving beams on one or two receiving units may be replaced, and the reference signal may be transmitted using the replaced transmitting beams, or the reference signal may be received using the replaced receiving beams, and the corresponding channel quality measurement results are obtained again. And so on. After traversing each transmitting beam and each receiving beam of all the transmitting units on the base station 10 and all the receiving units on the UE 20, one transmitting beam of each transmitting unit of the base station 10 and one receiving beam of each receiving unit of the UE 20 may be determined according to the obtained channel quality measurement results, to form a transmitting beam group and a receiving beam group.

Figure 4:
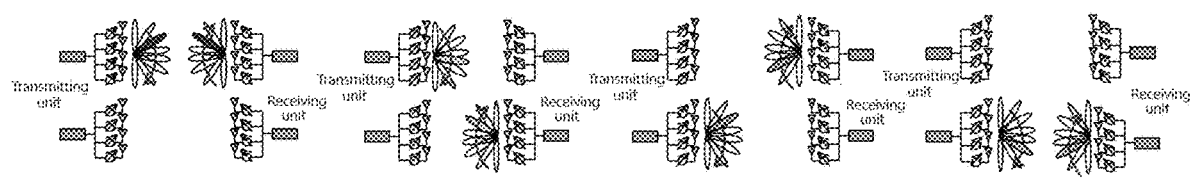
FIG. 4(a) shows a schematic diagram of polling transmitting/receiving beams.
FIG. 4(b) shows a schematic diagram of determining a transmitting beam group and/or a receiving beam group based on transmitting/receiving beam pairs determined in FIG. 4(a)
Figure 4:
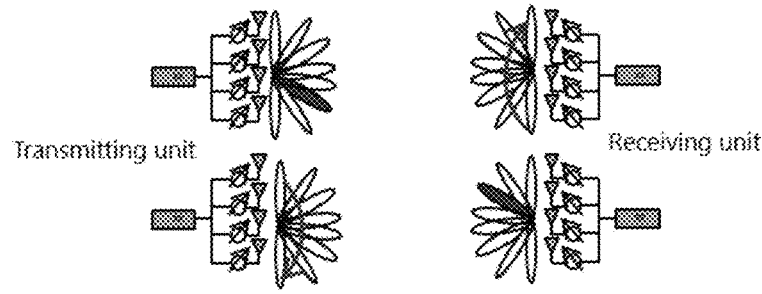

In another implementation, the beams may be selected by conducting a pair-wise search method on the beams. FIG. 4 shows an example of this method. This example may be the beam selection method described in "Efficient Beam Selection for Hybrid Beamforming" (C. Capar et al, IEEE doc: 802.11-15/1131r0). In this example, it is assumed that the base station has 2 transmitting beams and the UE has 2 receiving beams. FIG. 4(*a*) shows that each transmitting unit of the base station 10 and each receiving unit of the UE 20 perform transmitting/receiving beam polling to determine a transmitting/receiving beam pair formed by one transmitting beam of each transmitting unit of the base station 10 and one receiving beam of each receiving unit of the UE 20; FIG. 4(*b*) shows that on the basis of the transmitting/receiving beam pair determined in FIG. 4(*a*), the transmitting beam group of the base station 10 and/or the receiving beam group of the UE 20 are determined. Specifically, as shown in FIG. 4(*a*), from a first transmitting unit of the base station 10 and a first receiving unit of the UE 20, one transmitting beam and one receiving beam may be respectively selected in order as the transmitting/receiving beam pair for information (for example, the reference signal) transmission and reception; from a first transmitting unit of the base station 10 and a second receiving unit of the UE 20, one transmitting beam and one receiving beam may be respectively selected in order as the transmitting/receiving beam pair for information (for example, the reference signal) transmission and reception; from a second transmitting unit of the base station 10 and a first receiving unit of the UE 20, one transmitting beam and one receiving beam may be respectively selected in order as the transmitting/receiving beam pair for information (for example, the reference signal) transmission and reception; and from a second transmitting unit of the base station 10 and a second receiving unit of the UE 20, one transmitting beam and one receiving beam may be respectively selected in order as the transmitting/receiving beam pair for information (for example, the reference signal) transmission and reception. Then, one transmitting/receiving beam pair that satisfies a preset condition (for example, signal receiving quality) is selected from all transmitting/receiving beam pairs. Here, it is assumed that the selected transmitting/receiving beam pair includes one transmitting beam of the first transmitting unit and one receiving beam of the second receiving unit (as shown by the black part in FIG. 4(*b*)).

Subsequently, as shown in FIG. 4(b), the selected beam of the first transmitting unit of the base station 10 and the selected beam of the second receiving unit of the UE 20 are fixed, and each transmitting beam of the remaining transmitting units (the second transmitting unit) of the base station 10 are used sequentially to transmit the reference signal to each receiving beam of the remaining receiving units (first receiving unit) of the UE 20, and one beam of the second transmitting unit and one beam of the first receiving unit are determined according to, for example, the received signal quality, thereby determining the selected transmitting beam of the first transmitting unit and the determined transmitting beam of the second transmitting unit as the transmitting beam group of the base station 10, and determining the selected receiving beam of the second receiving unit and the determined receiving beam of the first receiving unit as the receiving beam group of the UE 20.

Figure 5:
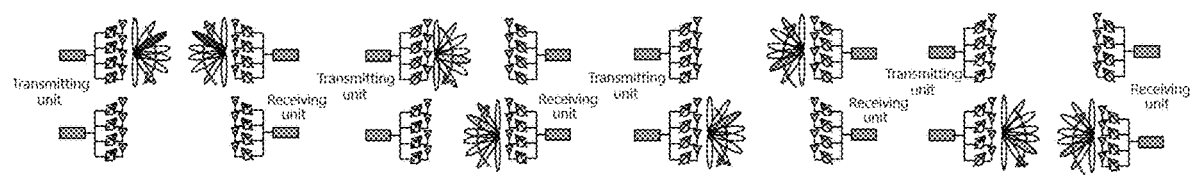
FIG. 5(a) shows a schematic diagram of polling transmitting/receiving beams respectively.
FIG. 5(b) shows a schematic diagram of determining a transmit beam group of a base station and/or a receive beam group of a UE based on FIG. 5(a).
Figure 5:
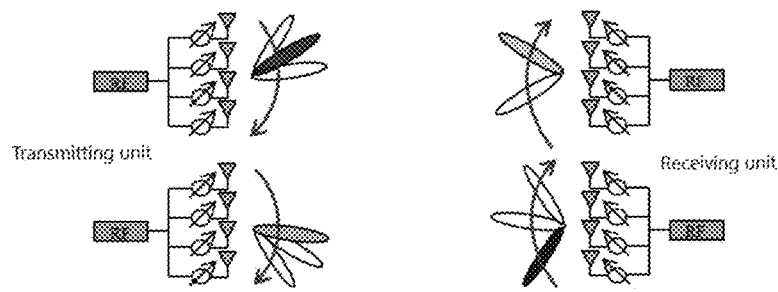

In another implementation, the beams may be selected by conducting a dominant search on the beams. FIG. 5 shows an example of this beam selection method. As shown in FIG. 5(a), in a similar manner to FIG. 4(a), by polling, one or more transmitting beams are selected for each transmitting unit of the base station, and one or more receiving beams are selected for each receiving unit of the UE. Then, as shown in FIG. 5(b), polling is performed on the selected one or more transmitting beams of each transmitting unit of the base station 10 and the selected one or more receiving beams of each receiving unit of the UE 20. That is, the reference signal is transmitted using each reference beam in turn, and is received using each reference beam respectively. And then according to the received signal quality, one transmitting beam is determined for each transmitting unit and one receiving beam is determined for each receiving unit. Thereby, a transmitting beam group is determined for each transmitting unit of the base station 10, and a receiving beam group is determined for each receiving unit of the UE 20.

Figure 6:
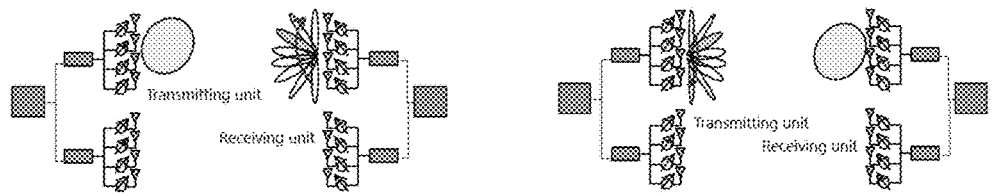
FIG. 6(a) shows a schematic diagram of polling transmitting/receiving beams respectively.
FIG. 6(b) shows a schematic diagram of determining a transmitting beam group of a base station and/or a receiving beam group of a UE.
Figure 6:
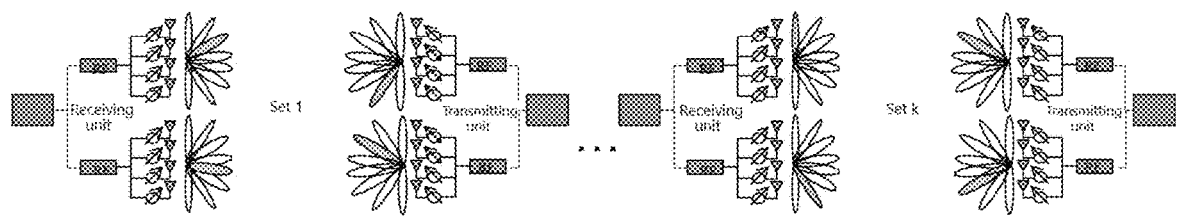

In another implementation, the beam selection may be conducted according to a K-best beam selection method shown in FIG. 6. The method shown in FIG. 6 is described in "Low complexity training, for hybrid forming" (F. Felhauer et al., IEEE doc: 802.11-16/0316r0), and will not be described in detail here. Briefly, FIG. 6(a) shows that transmitting/receiving beam polling are performed on each transmitting unit of the base station 10 and each receiving unit of the UE 20, respectively, so as to sort all transmitting beams/receiving beams on each transmitting unit of the base station 10 and each receiving unit of the UE 20 (for example, they may be sorted according to the channel state). When polling a transmitting beam of a transmitting unit of the base station 10, the corresponding receiving unit of the UE 20 may maintain an omnidirectional beam, and vice versa; FIG. 6(b) shows that k beam sets containing one transmitting beam of each transmitting unit of the base station 10 and one receiving beam of each receiving unit of the UE 20 are determined, according to a sorting result of all transmitting beams/receiving beams on each transmitting unit of the base station 10 and each receiving unit of the UE 20 in FIG. 6(a), and the transmitting beam group of the base station 10 and/or the receiving beam group of the UE 20 are determined from the k beam sets.

Figure 7:
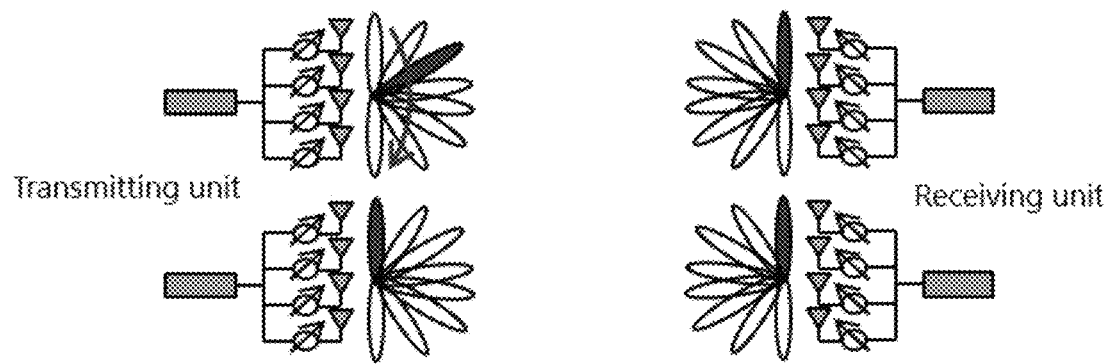
FIG. 7(a) shows a schematic diagram of determining transmitting beams on a first transmitting unit of a base station.
FIG. 7(b) shows a schematic diagram of determining transmitting beams on a second transmitting unit of the base station.
Figure 7:
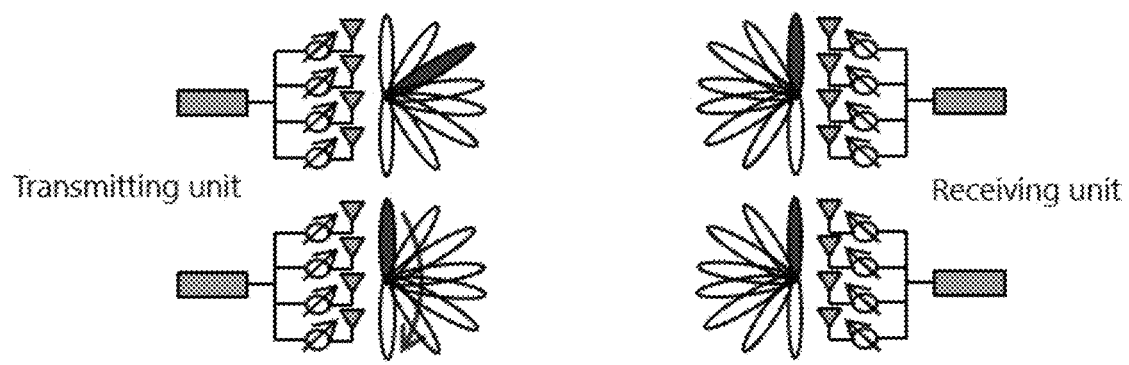

In another implementation, the beams may be selected according to a linear selection method shown in FIG. 7. The method shown in FIG. 7 is described in "Low Complement Lexity RF Beam Search Algorithms for millimeter-wave systems" (S. Rahman and K. Josiam, Proc. IEEE Global Telecom. Conf. (GLOBECOM), pp. 3815-3820, 2014) and Methods for linear, RF, and search in millimeter wave communication system with hybrid forming (S. Rahman, U.S. Patent No. 20140341310A1 [p], 2014-11-20), and will not be described in detail here. Briefly, as shown in FIG. 7(a), all transmitting beams on the first transmitting unit of the base station 10 are polled (that is, information is transmitted using each transmitting beam in turn), and one transmitting beam on the transmitting unit is determined, for example, according to the signal reception quality, during the polling process, the transmitting beams on the other transmitting units of the base station 10 and the receiving beams on each receiving unit of the UE 20 may be randomly fixed. Then, as shown in FIG. 7(b), all transmitting beams on the second transmitting unit of the base station 10 are polled, and one transmitting beam on the transmitting unit is determined. During the polling process, the transmitting beams on the other transmitting units of the base station 10 may be randomly fixed, or may be defined as the transmitting beam determined by polling before, and the receiving beams on each receiving unit of the UE 20 may be randomly fixed. By analogy, one transmitting beam of each transmitting unit of the base station 10 may be determined to form a transmitting beam group, and one receiving beam of each receiving unit of the UE 20 may be determined to form a receiving beam group.

In another implementation, the beam selection may be conducted according to a method shown in FIG. 8. FIG. 8(a) shows that receiving beam polling is performed on each receiving unit of the UE 20, and FIG. 8(b) shows that transmitting beam polling is performed on each transmitting unit of the base station 10, thereby determining one or more receiving beams of each receiving unit of the UE 20 and one or more transmitting beams of each transmitting unit of the base station 10, respectively. For example, when the transmitting beams of a certain transmitting unit of the base station 10 are polled, the corresponding receiving unit of the UE 20 may maintain an omnidirectional beam, and vice versa. FIG. 8(c) shows that according to the determined one or more receiving beams of each receiving unit of the UE 20 and one or more transmitting beams of each transmitting unit of the base station 10, all of the one or more transmitting beams of a certain transmitting unit of the base station 10 are polled to determine one transmitting beam of the one or more transmitting beams. During the polling process, as shown by the shaded part, the transmitting beams of the other units of the base station 10 and the receiving beams of each receiving unit of the UE 20 are fixed (may be fixed randomly or may be fixed as the transmitting beams/receiving beams determined according to the previous polling process). FIG. 8(d) shows that according to the determined one or more receiving beams of each receiving unit of the UE 20 and one or more transmitting beams of each transmitting unit of the base station 10, all of the one or more receiving beams of a certain receiving unit of the UE 20 are polled to determine one receiving beam of the one or more receiving beams. During the polling process, as shown by the shaded part, the receiving beams of the other receiving units of the UE 20 and the transmitting beams of each transmitting unit of the base station 10 are fixed (may be fixed randomly or may be fixed as the transmitting beams/receiving beams according to the previous polling process). Finally, according to the polling result, one transmitting beam of each transmitting unit of the base station 10 may be determined to form a transmitting beam group, and one receiving beam of each receiving unit of the UE 20 may be determined to form a receiving beam group.

In another implementation, the beams may be selected according to the method shown in FIG. 9. FIG. 9(a) shows that the receiving beam polling is performed on each receiving unit of the UE 20, and FIG. 9(*b*) shows that the transmitting beam polling is performed on each transmitting unit of the base station 10, so as to determine one or more receiving beams of each receiving unit of the UE 20 and one or more transmitting beams of each transmitting unit of the base station 10, respectively. For example, when the transmitting beams of a certain transmitting unit of the base station 10 are polled, the corresponding receiving unit of the UE 20 may maintain an omnidirectional beam, and vice versa. FIG. 9(*c*) shows that each transmitting/receiving beam pair are polled to determine a first transmitting/receiving beam pair, each transmitting/receiving beam pair being formed by each receiving beam in the one or more receiving beams of each receiving unit of the UE 20 and each transmitting beam in the one or more transmitting beams of each transmitting unit of the base station 10, respectively, as shown in the shaded part in FIG. 9(*c*). FIG. 9(*d*) shows that according to the one or more receiving beams of each receiving unit of the UE 20 and the one or more transmitting beams of each transmitting unit of the base station 10, each transmitting/receiving beam pair are polled to determine a second transmitting/receiving beam pair, each transmitting/receiving beam pair being formed by each receiving beam in the one or more receiving beams of the other receiving units of the UE 20 and each transmitting beam in the one or more transmitting beams of the other transmitting units of the base station 10, respectively, except for the transmitting unit/receiving unit where the first transmitting/receiving beam pair is located, as shown by the shaded part at both ends of the line in FIG. 9(*d*). During the polling process as shown in FIG. 9(*d*), the first transmitting/receiving beam pair may be kept fixed.

The wireless communication method, user equipment, and base station according to the embodiments of the present invention may use the foregoing beam selection methods shown in FIGS. 3 to 9 to select beams and construct a beam group, and use the beams/beam group to perform information interaction. Corresponding beam group identifications may be assigned to each constructed beam group. Of course, each of the foregoing beam selection methods listed in FIG. 3 to FIG. 9 is merely an example. In a practical application process, the wireless communication method, user equipment, and base station according to the embodiments of the present invention may be applicable to any wireless communication system including one or more base stations having one or more transmitting units and one or more UEs having one or more receiving units, and may use any beam selection method adopted by this wireless communication system.

FIG. 10 shows a flowchart of a wireless communication method 1000 according to one embodiment of the present invention. The method may be performed by a user equipment.

As shown in FIG. 10, in step S1001, beam configuration information transmitted by a base station using at least one transmitting beam group is received, where the beam configuration information includes an identification of the at least one transmitting beam group and measurement configuration information of the at least one transmitting beam group. As described above, although the terms "transmitting beam" and "transmitting beam group" are used above and here, since a reference signal may be transmitted through different transmitting beams, the reference signal may be used to represent the transmitting beam. If the same reference signal is transmitted with different transmitting beams, it may be described as transmitting the reference signal with different spatial filters. If the same reference signal is transmitted with the same transmitting beam, it may be described as transmitting a reference signal with the same spatial filter. Without special description, the reference signal may be considered to be transmitted with different transmitting beams, that is, the reference signal may represent the transmitting beam. Therefore, the transmitting beams described above and here may be replaced with the reference signals, and the transmitting beam group may be replaced with reference signal group. Accordingly, the remaining terms related to the transmitting beam may also be replaced with terms related to the reference signal. In the following, for convenience of description, embodiments of the present invention are still described using the transmitting beam and the transmitting beam group.

In this step, the base station may select one or more transmitting beam groups from at least one transmitting beam group, and transmit the beam configuration information including the transmitting beam group identification and the measurement configuration information via the selected transmitting beam group. The at least one transmitting beam group may be one or more transmitting beam groups constructed by the beam selection methods described above. Correspondingly, a UE may receive the beam configuration information transmitted by the base station using at least one transmitting beam group.

FIG. 11 shows a specific content example of CSI resource configuration according to the 3GPP standard TS 38.311. As shown in FIG. 11, an information element CSI-ReportConfig may include a plurality of CSI-ResourceConfigIds, where resources used for channel measurement resourceForChannelMeasurement may be indicated by CSI-ResourceConfigId, to represent reference signal (RS) configuration for channel measurement in the first later (L1). Further, as shown in the shaded block diagram on the right, the CSI-ResourceConfigId may further include CSI-ResourceConfig, and may include the measurement configuration information of a channel state information reference signal (CSI-RS) resource for indicating channel measurement resource and/or a synchronization signal block (SSB) resource, and so on. The transmitting beam group in the embodiment of the present invention may be constructed inside the above-mentioned one CSI-ResourceConfig, or may correspond to a plurality of CSI-ResourceConfigs, or may be constructed inside one resourceForChannelMeasurement, or may correspond to a plurality of resourceForChannelMeasurements, which is not limited herein. Optionally, the measurement configuration information of the transmitting beam group may include configuration information (or referred to as indication information) of at least one transmitting beam in the transmitting beam group of the base station, where the configuration information of the transmitting beam may indicate the transmitting beam in various ways. For example, the indication information of the transmitting beam may indicate the transmitting beam through one or more of a beam index of the transmitting beam, a resource configuration index of a beam reference signal, and the spatial filter.

In an implementation, the measurement configuration information of the transmitting beam group may further include: repetition indication information.

Figure 12:
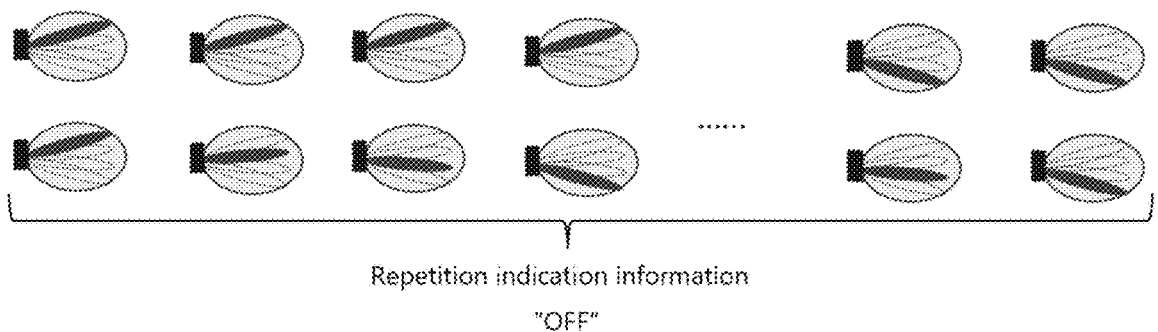
FIG. 12(a) shows a schematic diagram of repetition indication information according to an embodiment of the present invention.
FIG. 12(b) shows a schematic diagram of repetition indication information according to another embodiment of the present invention.
Figure 12:
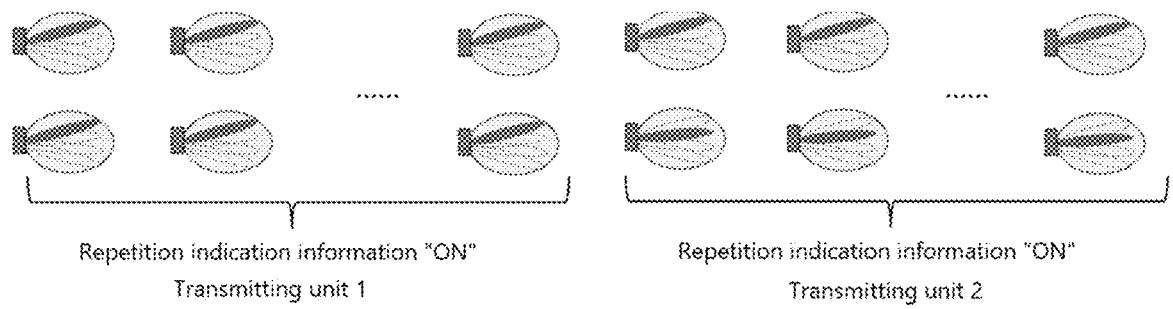

In one example, the repetition indication information may correspond to a certain transmitting beam group of the base station, to indicate whether the base station currently uses the same transmitting beam (or spatial filter) as previous for the beam group to transmit the beam configuration information. For example, when the repetition indication information is "ON" and corresponds to a transmitting beam group of the base station with an identification 1, the base station may be indicated to use the same transmitting beam (or spatial filter) currently as previous for the beam group to transmit the beam configuration information. At this time, the UE may perform a beam scan using a different receiving beam group than before to select a receiving beam group corresponding to the transmitting beam group whose identification is 1. When the repetition indication information is "OFF" and corresponds to the transmitting beam group of the base station with an identification 1, the base station may be indicated not to use the same transmitting beam (or spatial filter) currently as previous to transmit the beam configuration information for the beam group (for example, the base station may transmit the beam configuration information by replacing the transmitting beam group with an identification 2). At this time, the UE may keep the same the receiving beam group as before to receive the beam configuration information, and select the transmitting beam group corresponding to the receiving beam group. FIG. 12 shows a schematic diagram of the repetition indication information according to one embodiment of the present invention. FIGS. 12(a) and 12(b) are different examples in which the repetition indication information corresponds to the transmitting beam group of the base station, but the status includes "OFF" or "ON". As shown in FIG. 12(a), the repetition indication information corresponds to the transmitting beam group of the base station and is always kept "OFF". At this time, the base station transmits the beam configuration information using the transmitting beams different from the previous transmitting beam at each moment. As described above, the UE may correspondingly keep the same receiving beam group for reception, and select the transmitting beam group corresponding to the receiving beam group. As shown in FIG. 12(b), the repetition indication information corresponds to the transmitting beam group 1 of the base station. In the first half, the repetition indication information is always kept "ON". At this time, the base station transmits the beam configuration information using the same transmitting beam for the transmitting beam group 1 at each moment in the first half. Correspondingly, the UE may perform a beam scan separately with different receiving beam groups, to select the receiving beam group corresponding to the transmitting beam group 1. In the second half, the base station changes the transmitting beam group to the transmitting beam group 2 and uses the same transmitting beam for the transmitting beam group 2 at each moment in the second half. Correspondingly, the repetition indication information is always kept "ON", and the UE may use different receiving beam groups to scan and receive at this time, and select the receiving beam group corresponding to the transmitting beam group 2.

Figure 13:
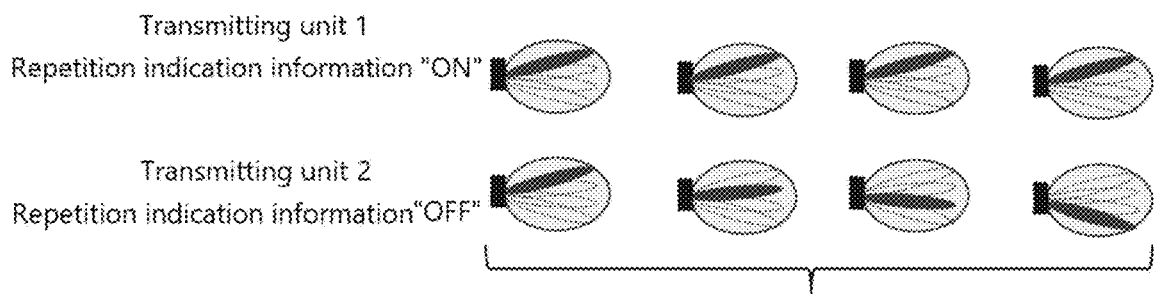
FIG. 13(a) shows a schematic diagram of repetition indication information according to an embodiment of the present invention.
FIG. 13(b) illustrates a schematic diagram of repetition indication information according to another embodiment of the present invention.
Figure 13:
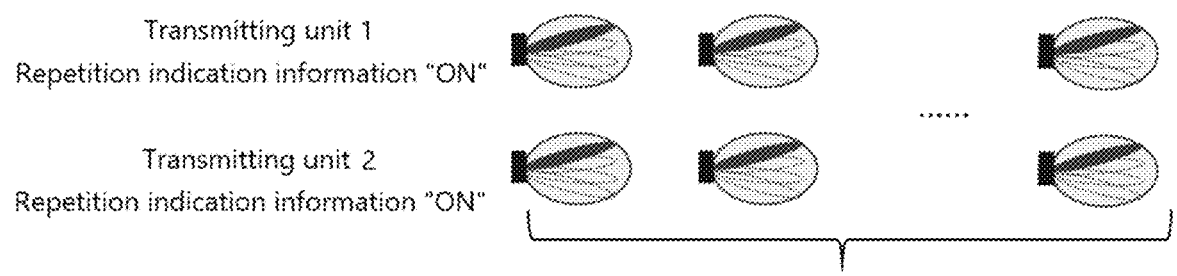

In another example, the repetition indication information may correspond to one or more transmitting units of the base station, to indicate whether the base station currently uses the same transmitting beam (or spatial filter) as previous for the one or more transmitting units to transmit the beam configuration information. For example, when the repetition indication information is "ON" and corresponds to a transmitting unit 1 of the base station, the base station may be indicated to use the same transmitting beam 1 currently as previous for the transmitting unit 1 to transmit the beam configuration information. At this time, for the transmitting unit 1, the UE may perform the beam scan using a different receiving beam group than before to select a receiving beam group corresponding to the transmitting beam 1. When the repetition indication information is "OFF" and corresponds to the transmitting unit 1 of the base station, the base station may be indicated to currently use a transmitting beam 2 different from the previous transmitting beam 1 to transmit the beam configuration information. At this time, the UE may keep the same the receiving beam group as before for reception, and select the transmitting beam corresponding to the receiving beam group. FIG. 13 shows a schematic diagram of the repetition indication information according to one embodiment of the present invention. FIG. 13(a) is a schematic diagram where the repetition indication information 1 and 2 correspond to the transmitting unit 1 and transmitting unit 2 of the base station, respectively, and the repetition indication information 1 and 2 are "ON" and "OFF", respectively. FIG. 13(b) is an example where the repetition indication information 1 and 2 correspond to the transmitting unit 1 and transmitting unit 2 of the base station, respectively, and both the repetition indication information 1 and 2 are "ON". As shown in FIG. 13(a), the repetition indication information 1 corresponds to the transmitting unit 1 of the base station and is always kept "ON". At this time, the base station always adopts the same transmitting beams as previous on this transmitting unit 1. The repetition indication information 2 corresponds to the transmitting unit 2 of the base station and is always kept "OFF". At this time, the base station always adopts the transmitting beams different from the previous transmitting beams on this transmitting unit 2. For this case, it means that the base station may always keep the same transmitting beam on the transmitting unit 1, and only perform scanning for the different transmitting beams on the transmitting unit 2. At this time, the UE may use the same receiving beam group for reception, and select the transmitting beam on the transmitting unit 2 corresponding to this receiving beam group. Alternatively, the UE may use the determined receiving beam of the receiving unit of the corresponding transmitting unit 1 and a beam group constructed by a same beam of the corresponding transmitting unit 2 to receive, so as to determine the transmitting beam on the transmitting unit 2 corresponding to this receiving beam group. As shown in FIG. 13(b), the repetition indication information 1 corresponds to the transmitting unit 1 of the base station, and is always kept "ON". At this time, the base station always transmits with the same transmitting beam on this transmitting beam group 1. The repetition indication information 2 corresponds to the transmitting unit 2 of the base station, and is always kept "ON". At this time, the base station also always transmits with the same transmitting beam on this transmitting beam group 2. This case means that the base station always uses the same transmitting beam group to transmit. At this time, the UE may use different receiving beam groups to perform beam scanning to select the receiving beam group corresponding to the transmitting beam group.

Optionally, the repetition indication information may use a value of one bit to indicate different states of "ON" or "OFF" thereof. For example, a bit with a value of 1 may be used to indicate "ON", and a bit with a value of 0 may be used to indicate "OFF"; conversely, a bit with a value of 0 may be used to indicate "ON", and a bit with a value of 1 may be used to indicate "OFF". The above various descriptions of the repetition indication information are merely examples. In practical applications, any representation manner of the repetition indication information may be adopted to represent the repetition of the transmitting beam group and/or the transmitting beam, which is not limited herein.

In one implementation, the beam configuration information transmitted by the base station may further include: the number of transmitting beam groups that the base station needs to receive the feedback information from user equipment; accordingly, the user equipment may feed the feedback information back according to a quantity defined by the beam configuration information. For example, the beam configuration information transmitted by the base station may include: the feedback information of 3 transmitting beam groups that need to be received from the user equipment, so that even if the user equipment receives beam configuration information transmitted by, for example, 5 transmitting beam groups, it is also possible to feed back only the feedback information corresponding to a maximum of three transmitting beam groups. The transmitting beam groups to which the feedback is directed may be selected in different ways. For example, in a case where the (absolute) channel measurement result threshold is configured at the base station, if the channel quality measurement results of the beams of N (N≥3) transmitting beam groups out of the 5 transmitting beam groups exceed the threshold, 3 transmitting beam groups may be selected from the N transmitting beam groups for feedback. For example, any 3 beam groups or 3 transmitting beam groups with the best channel quality measurement results may be selected. If the channel quality measurement results of the beams of N (1≤N<3) transmitting beam groups out of the 5 transmitting beam groups exceed the threshold, the N transmitting beam groups may be selected for feedback. If the channel quality measurement results of the beams of the 5 transmitting beam groups do not exceed the threshold, the UE may not feedback, or select the transmitting beam group with the best channel quality measurement result of the beams among the five transmitting beam groups for feedback. Alternatively, in a case where the (relative) channel measurement result threshold is configured at the base station, it is possible to find out the transmitting beam groups among the five transmitting beam groups whose channel quality measurement result difference to the optimal channel quality measurement result of the five transmitting beam groups is less than the relative threshold. If the number of the found transmitting beam groups is greater than or equal to three, three transmitting beam groups (for example, any three transmitting beam groups or three transmitting beam groups with the smallest difference) may be selected for feedback. If the number of the found transmitting beam groups is less than three, feedback may be performed on the found transmitting beam groups. If the transmitting beam groups are not found, there is no feedback or a transmitting beam group with the smallest difference may be selected for feedback. Of course, the above feedback manners of the feedback information are only examples. In practical applications, the number of transmitting beam groups that the base station needs to receive the feedback information from the user equipment may be greater than, equal to, or less than the number of transmitting beam groups for transmitting the beam configuration information, which is not limited herein.

In one implementation, the measurement configuration information of the transmitting beam group may include a channel quality type measured by the user equipment, and thus, the user equipment may obtain feedback information of a corresponding type of channel quality according to the channel quality type. The type of the channel quality measured by the user equipment and indicated by the base station may be, for example, a reference signal received quality (RSRQ), a reference signal received power (RSRP), a signal-to-interference and noise ratio (SINR), a received signal strength indicator (RSSI), and the like. In one example, the type of channel quality measured by the user equipment and indicated by the base station may be RSRQ.

In another example, the type of channel quality measured by the user equipment and indicated by the base station may be RSRP, for example, it may be an average RSRP corresponding to the transmitting beam group. In another example, the type of channel quality measured by the user equipment and indicated by the base station may be SINR, for example, it may be an average SINR corresponding to the transmitting beam group. Accordingly, in one example, the measurement configuration information of the transmitting beam group may further include measurement configuration information for indicating one or more reference signal strength measurements, for example, the measurement configuration information of the transmitting beam group may include the measurement configuration information of one or more channel state information reference signal (CSI-RS) strength measurements, or the measurement configuration information of one or more SSB strength measurements. In another example, the measurement configuration information of the transmitting beam group may further include: the measurement configuration information of RSSI corresponding to one or more CSI-RSs or SSBs and/or the measurement configuration information of interference strength.

In step S1002, the UE may feed back the feedback information about the channel quality according to the beam configuration information.

In one implementation of the present invention, when the beam configuration information transmitted by the base station includes the number of transmit beam groups that the base station needs to receive the feedback information from the user equipment, the user equipment may feed back the feedback information according to the quantity defined by the beam configuration information.

In one implementation manner of the present invention, when the measurement configuration information of the transmitting beam group transmitted by the base station includes the channel quality type measured by the user equipment, the user equipment may obtain the feedback information of a corresponding channel quality type according to the channel quality type. As described above, the type of channel quality measured by the user equipment and indicated by the base station may be, for example, RSRQ, RSRP, SINR, RSSI, and the like.

In one example, the type of channel quality measured by the user equipment and indicated by the base station may be RSRP. Specifically, the UE may, for example, measure reference signal resource elements (REs) of one or more CSI-RSs or SSBs based on the measurement configuration information of the transmitting beam group transmitted by the base station, to obtain an average L1-RSRP corresponding to the transmitting beam group as the feedback information about the channel quality.

In another example, the type of channel quality measured by the user equipment and indicated by the base station may be RSRQ, for example, it may be an average RSRQ corresponding to the transmitting beam group. Specifically, the UE may obtain an average L1-RSRQ of the transmitting beam group based on the measurement configuration information of the transmitting beam group, for example, according to the L1-RSRQ obtained by measuring each reference signal configured in the transmitting beam group. For example, when the measurement configuration information of the transmitting beam group indicates that two reference signals are measured, an average value of a first L1-RSRQ and a second L1-RSRQ obtained may be used to obtain the average L1-RSRQ of the transmitting beam group. The L1-RSRQ of each reference signal may be obtained by measuring the strength of the reference signal and measuring the RSSI. At this time, the measurement configuration information of the transmitting beam group may include measurement configuration information for indicating a reference signal strength measurement. For example, the measurement configuration information of the transmitting beam group may include measurement configuration information indicating CSI-RS strength measurement, or measurement configuration information indicating SSB strength measurement. In addition, optionally, the RSSI may be a total energy strength received on reference signal resource elements or resource elements over an entire bandwidth of a time symbol where the reference signal resource elements are located, or a reference signal of a plurality of reference signal configurations within the transmitting beam group may be received as the interference strength measurement configuration of the reference signal using the same receiving beam. For example, the measurement configuration information of the transmitting beam group may also be explicitly configured with: the measurement configuration information of the receiving signal strength indication of at least one transmitting beam in the transmitting beam group and/or the measurement configuration information of the interference strength. Accordingly, the feeding back the channel quality feedback information according to the beam configuration information may include: obtaining a reference signal received quality of the transmitting beam group according to the measurement configuration information of the receiving signal strength indication and/or the measurement configuration information of the interference strength. For another example, the feeding back of the channel quality feedback information according to the beam configuration information may further include: obtaining the reference signal received quality of the transmitting beam group according to a preset configuration. The preset configuration may be configured implicitly. In one example, the preset configuration of the reference signal received quality corresponding to the transmitting beam group obtained according to the receiving signal strength indication and/or the interference strength may be pre-configured on both sides of the UE and the base station; it may also be pre-configured to the base station and notified to the UE in advance through signaling; or it may be pre-configured to the UE and reported to the base station through signaling. The measurement configuration information content and various preset configuration methods described above are merely examples. In practical applications, the any measurement configuration information content and preset configuration methods may be adopted, and are not limited herein.

In yet another example, the type of channel quality measured by the user equipment and indicated by the base station may be SINR, for example, it may be an average SINR corresponding to the transmitting beam group. Specifically, the UE may obtain an average L1-SINR of the transmitting beam group based on the measurement configuration information of the transmitting beam group, for example, according to the L1-SINR obtained by measuring each reference signal configured in the transmitting beam group. For example, when the measurement configuration information of the transmitting beam group indicates that two reference signals are measured, an average value of a first L1-SINR and a second L1-SINR obtained may be used to obtain the average L1-SINR of the transmitting beam group. The L1-SINR of each reference signal may be obtained by measuring the strength of the reference signal and measuring the interference strength. At this time, the measurement configuration information of the transmitting beam group may include measurement configuration information for indicating one or more (for example, two) reference signal strength measurements. For example, the measurement configuration information of the transmitting beam group may include measurement configuration information indicating CSI-RS strength measurement, or measurement configuration information indicating SSB strength measurement. For example, the measurement configuration information of the transmitting beam group may also be explicitly configured with: the measurement configuration information of the interference strength; correspondingly, feeding back the feedback information about the channel quality according to the beam configuration information may include: obtaining a signal-to-interference and noise ratio of the transmitting beam group according to the measurement configuration information of the interference strength. For another example, the feeding back of the channel quality feedback information according to the beam configuration information may further include: obtaining the signal-to-interference and noise ratio of the transmitting beam group according to a preset configuration. The preset configuration may be configured implicitly. In one example, the preset configuration of the signal-to-interference and noise ratio corresponding to the transmitting beam group obtained according to the interference strength may be pre-configured on both sides of the UE and the base station; it may also be pre-configured to the base station and notified to the UE in advance through signaling; or it may be pre-configured to the UE and reported to the base station through signaling. For example, as an example of an implicit configuration, it may be configured such that the interference corresponding to a certain reference signal in the transmitting beam group may be measured by measuring the interference received on the reference signal resource elements, or the interference received on the entire bandwidth of the time symbol where the reference signal resource elements are located, or by receiving the interference at the position of another reference signal element within the transmitting beam group using the same receiving beam. The measurement configuration information content and various preset configuration methods described above are merely examples. In practical applications, the any measurement configuration information content and preset configuration methods may be adopted, and are not limited herein.

FIG. 14 shows a schematic diagram of measuring a reference signal strength according to one embodiment of the present invention. FIG. 14(a) shows an example of conducting the signal strength measurement on CSI-RS; FIG. 14(b) shows another example of conducting the signal strength measurement on CSI-RS; FIG. 14(c) shows an example of conducting the signal strength measurement on SSB; FIG. 14(d) shows another example of conducting the signal strength measurement on SSB. As shown in FIGS. 14(a)-(d), in one transmitting beam group of the base station, different transmitting beams may be used to transmit the same or different reference signal resource elements (REs). Specifically, different transmitting beams may correspond to the same or different REs. For example, FIG. 14(a) and FIG. 14(b) show that the transmitting beams indicated by vertical line filling in the transmitting beam group correspond to the REs of the CSI-RS indicated by vertical line filling, and the transmitting beams indicated by the oblique line in the transmitting beam group correspond to the REs of the CSI-RS indicated by the oblique line filling. FIGS. 14(c) and 14(d) show that the transmitting beams indicated by the vertical line filling in the transmitting beam group correspond to the REs of the SSB, and the transmitting beams indicated by the oblique line filling in the transmitting beam group corresponds to the REs of the SSB indicated by the oblique line filling. After receiving the measurement configuration information transmitted by the base station by using the transmitting beam group, the UE may use the corresponding receiving beams to conduct reference signal strength measurement on the indicated RE resources. Specifically, FIGS. 14(a)-(b) show that reference signal strength measurements are conducted on the REs of the CSI-RS indicated by vertical line filling. For example, for the RE of the reference signal indicated by vertical line filling, the UE may use one receiving beam of one of its receiving units to measure the strength of the reference signal transmitted by the transmitting beam 1 indicated by vertical line filling corresponding to the RE, and for the RE of the reference signal indicated by stripe filling, the UE may use one receiving beam of the other one of its receiving units to measure the strength of the reference signal transmitted by the transmitting beam 2 indicated by stripe filling corresponding to the RE. Then, an average value of the two measurement results may be calculated as a reference signal strength measurement result of the transmitting beam pair formed by the transmitting beam 1 and the transmitting beam 2. Alternatively, the UE may use the beams of a plurality of receiving units to simultaneously measure the reference signal transmitted by the transmitting beam 1 indicated by vertical line filling and the reference signal transmitted by the transmitting beam 2 indicated by the stripe filling as the reference signal strength measurement result of the transmit beam pair formed by the transmitting beam 1 and the transmitting beam 2. FIGS. 14(c)-(d) show that the reference signal strength measurement is conducted on the REs of the SSB. In this case, the channel quality measurement result of the transmitting beam group of the base station may be determined in a similar manner to that shown in FIGS. 14(a)-(b), and details are not described herein again.

FIG. 15 shows a schematic diagram of measuring the reference signal strength and the interference strength to determine the SINR of the transmitting beam group according to one embodiment of the present invention. FIGS. 15(a) to 15(c) show three examples of conducting reference signal strength and interference strength measurements on CSI-RS respectively; FIG. 15(d) shows one example of conducting reference signal strength and interference strength measurements on SSB. As shown in FIGS. 15(a)-(d), in one transmitting beam group of the base station, different transmitting beams are used to transmit the same or different reference signal resource elements (REs), respectively. For example, FIGS. 15(a)-(c) may include REs of the CSI-RSs indicated by vertical line filling and REs of the CSI-RSs indicated by oblique line filling, corresponding to the transmitting beams in the transmitting beam group, respectively; FIG. 15(d) may include REs of the SSBs indicated by vertical line filling and REs of the SSBs indicated by oblique line filling, corresponding to the transmitting beams in the transmitting beam group, respectively. In addition, FIGS. 15(b)-(c) further include REs of the CSI-RSs for measuring the interference strength indicated by square grid filling. Specifically, FIG. 15(a) shows that the reference signal strength and interference strength measurements are conducted on the REs of the CSI-RSs indicated by vertical line filling corresponding to the transmitting beam 1 indicated by vertical line filling, respectively, and the reference signal strength and interference strength measurements are conducted on the REs of the CSI-RSs indicated by oblique line filling corresponding to the transmitting beam 2 indicated by oblique line filling, respectively. Then, the reference signal strength measurement results and interference strength measurement results of the two transmitting beams are averaged to obtain the measurement results of the transmitting beam group. FIG. 15(b) shows that the measurement of the reference signal strength is conducted on the REs of the CSI-RSs indicated by vertical line filling corresponding to the transmitting beam 1 indicated by vertical line filling, while the interference strength measurement is conducted on the REs of the CSI-RSs filled by square grid (that is, the REs coincident with the REs of the CSI-RSs indicated by oblique line filling corresponding to the transmitting beam 2 indicated by oblique line filling), so that the SINR corresponding to the transmitting beam 1 may be determined. Then the reference signal strength measurement may be conducted on the REs of the CSI-RSs indicated by oblique line filling corresponding to the transmitting beam 2 indicated by oblique line filling, while the interference strength measurement is conducted on the REs that coincides with the REs of the CSI-RSs indicated by vertical line filling, so that the SINR corresponding to the transmitting beam 2 may be determined. Then, the SINRs of the transmitting beams 1 and 2 may be averaged to obtain the SINR of the transmitting beam group. FIG. 15(c) shows that the reference signal strength measurement is conducted on the REs of the CSI-RSs indicated by vertical line filling corresponding to the transmitting beam 1 indicated by vertical line filling, while the interference strength measurement is conducted on the REs of the CSI-RSs filled by square grid (i.e., the REs that coincides with the REs of the CSI-RSs indicated by oblique line filling corresponding to the transmitting beam 2 indicated by oblique line filling, and the neighboring REs), so that the SINR corresponding to the transmitting beam 1 may be determined. Then the reference signal strength measurement may be conducted on the REs of the CSI-RSs indicated by oblique line filling corresponding to the transmitting beam 2 indicated by oblique line filling, while the interference strength measurement is conducted on the REs coincident with the REs of the CSI-RSs indicated by vertical line filling and the neighboring REs, so that the SINR corresponding to the transmitting beam 2 may be determined. Then, the SINRs of the transmitting beams 1 and 2 may be averaged to obtain the SINR of the transmitting beam group. FIG. 15(d) shows that the reference signal strength measurement and the interference strength measurement are conducted on the REs of the SSBs indicated by vertical line filling corresponding to the transmitting beam 1 indicated by vertical line filling, so that the SINR of the transmitting beam 1 may be determined, and the reference signal strength measurement and the interference strength measurement are conducted on the REs of the SSBs indicated by oblique line filling corresponding to the transmitting beam 1 indicated by oblique line filling, so that the SINR of the transmitting beam 2 may be determined. And the SINRs of the two transmitting beams are averaged to obtain the SINR of the transmitting beam group. For the signal strength measurement and the interference strength measurement of the same beam (or RS configuration), the UE may use the same receiving unit or receiving beam.

FIG. 16 shows a schematic diagram of measuring the reference signal strength and the received signal strength indicator according to one embodiment of the present invention. FIGS. 16(a) to 16(c) show three examples of conducting reference signal strength and received signal strength indicator measurements on CSI-RS respectively; FIG. 16(d) shows one example of conducting reference signal strength and received signal strength indicator measurements on SSB. As shown in FIGS. 16(a)-(d), in one transmitting beam group of the base station, different transmitting beams are used to transmit the same or different reference signal resource elements (REs), respectively. For example, FIGS. 16(a)-(c) may include REs of the CSI-RSs indicated by vertical line filling and REs of the CSI-RSs indicated by oblique line filling, corresponding to two transmitting beams in the transmitting beam group, respectively; FIG. 16(d) may include REs of the SSBs indicated by vertical line filling and REs of the SSBs indicated by oblique line filling, corresponding to two transmitting beams in the transmitting beam group, respectively. In addition, FIGS. 16(b)-(c) further include REs of the CSI-RSs for measuring the received signal strength indicator indicated by dash-dotted line filling. Specifically, FIG. 16(a) shows that the reference signal strength and received signal strength indicator measurements are conducted on the REs of the CSI-RSs indicated by vertical line filling corresponding to the transmitting beam 1 indicated by vertical line filling, respectively, so that the RSRQ of the transmitting beam 1 is determined, and the reference signal strength and received signal strength indicator measurements are conducted on the REs of the CSI-RSs indicated by oblique line filling corresponding to the transmitting beam 2 indicated by oblique line filling, respectively, so that the RSRQ of the transmitting beam 2 is determined. Then, the RSRQ of the two transmitting beams are averaged to obtain the RSRQ of the transmitting beam group. FIG. 16(b) shows that the measurement of the reference signal strength is conducted on the REs of the CSI-RSs indicated by vertical line filling corresponding to the transmitting beam 1 indicated by vertical line filling, while the received signal strength indicator measurement is conducted on both the REs of the CSI-RSs filled by vertical line and the REs of the CSI-RSs filled by dash-dotted line (that is, the REs coincident with the REs of the CSI-RSs indicated by oblique line filling corresponding to the transmitting beam 2 indicated by oblique line filling), so that the RSRQ of the transmitting beam 1 is determined. The reference signal strength measurement may be conducted on the REs of the CSI-RSs indicated by oblique line filling corresponding to the transmitting beam 2 indicated by oblique line filling, while the received signal strength indicator measurement is conducted on both the REs of the CSI-RSs filled by oblique line and the REs that coincides with the REs of the CSI-RSs indicated by vertical line filling, so that the RSRQ of the transmitting beam 2 is determined. Then, the RSRQs of the two transmitting beams are averaged as the RSRQ of the transmitting beam group. FIG. 16(c) shows that the reference signal strength measurement is conducted on the REs of the CSI-RSs indicated by vertical line filling corresponding to the transmitting beam 1 indicated by vertical line filling, while the received signal strength indicator measurement is conducted on both the REs of the CSI-RSs filled by vertical line and the REs of the CSI-RSs filled by dash-dotted line (i.e., the REs that coincides with the REs of the CSI-RSs indicated by oblique line filling corresponding to the transmitting beam 2 indicated by oblique line filling, and the neighboring REs), so that the RSRQ of the transmitting beam 1 is determined. Then the reference signal strength measurement may be conducted on the REs of the CSI-RSs indicated by oblique line filling corresponding to the transmitting beam 2 indicated by oblique line filling, while the received signal strength indicator measurement is conducted on both the REs of the CSI-RSs indicated by oblique line filling and the REs coincident with the REs of the CSI-RSs indicated by vertical line filling and the neighboring REs of the RE, so that the RSRQ of the transmitting beam 2 is determined. Then, the RSRQs of the two transmitting beams are averaged as the RSRQ of the transmitting beam group. FIG. 16(d) shows that the reference signal strength measurement and the received signal strength indicator measurement are conducted on the REs of the SSBs indicated by vertical line filling corresponding to the transmitting beam 1 indicated by vertical line filling, respectively, so that the RSRQ of the transmitting beam 1 is determined, and the reference signal strength measurement and the received signal strength indicator measurement are conducted on the REs of the SSBs indicated by oblique line filling corresponding to the transmitting beam 1 indicated by oblique line filling, so that the RSRQ of the transmitting beam 2 may be determined. And the RSRQs of the two transmitting beams are averaged to obtain the RSRQ of the transmitting beam group. For the reference signal strength and the received signal strength measurements of the same beam (or RS configuration), the UE may use the same receiving unit or receiving beam.

In the embodiments of the present invention, after obtaining the feedback information about the channel quality according to the beam configuration information, the UE may feed back the feedback information to the base station, so that the base station selects one or more transmitting beam groups among the at least one transmitting beam group according to the feedback information. Specifically, the feedback information may be associated with one or more transmitting beam groups in the at least one transmitting beam group, so that the feedback information may further include an identification of the one or more transmitting beam groups. For example, the feedback information reported by the UE may include, for example, an identification 1 of the transmitting beam group and its corresponding channel quality feedback information. As described above, the type of channel quality measured by the user equipment and indicated by the base station may be, for example, RSRQ, RSRP, SINR, RSSI, and so the like. In one example, the feedback information fed back by the UE may include one or more of the following feedback information: transmitting beam group identification_RSRP (or, CSI_transmitting beam group identification_RSRP and/or SSB_transmitting beam group identification_RSRP), transmitting beam group identificatio)_RSRQ/SINR (or, CSI_transmitting beam group identification_RSRQ/SINR and/or SSB_transmitting beam group identification_RSRQ/SINR. Here, RSRQ means user feedback RSRQ, SINR means user feedback SINR, RSRQ/SINR means one or all of user feedback RSRQ and SINR), transmitting beam group identification_RSRP_RSRQ/SINR (or, CSI_transmitting beam group identification_RSRP_RSRQ/SINR and/or SSB_transmitting beam group identification_RSRP_RSRQ/SINR. Here, RSRP_RSRQ means that the user feeds back both RSRP and RSRQ simultaneously). The above feedback information of the UE is only an example. In practical applications, the UE may use any feedback information about the channel quality obtained according to the beam configuration information for feedback, which is not limited herein. In addition, when the user feeds back the signal quality measurement results RSRQ, RSRP, SINR, or RSSI of a plurality of transmitting beam groups, a plurality of absolute values of these results may be fed back, or the absolute channel quality measurement results may be fed back for the optimal transmitting beam group (for example, the transmitting beam group with the best channel quality), while the relative difference to the absolute channel quality measurement results of the optimal transmitting beam group are fed back for other transmitting beam groups.

The steps of the wireless communication method performed by the user equipment according to the embodiment of the present invention are described above. In another implementation of the present invention, information transmitted by the base station about the transmitting units may also be received, where the information about the transmitting units indicates an identification of at least one transmitting unit and the configuration information of the transmitting beams possessed by the at least one transmitting unit. According to the information about the transmitting units, one or more transmitting beams in the at least one transmitting unit are selected, and beam selection information indicating the user equipment selection result is fed back. The beam selection information may include the identification of the at least one transmitting unit, indication information of the transmitting beams selected in the transmitting unit, and/or channel feedback information corresponding to the selected transmitting beams. Specifically, according to the information transmitted by the base station about the transmitting unit, the base station may let the UE know about the number of transmitting units of the base station, the identifications of the transmitting units, and the transmitting beams possessed by each transmitting unit, so that the UE may select one or more transmitting beams from different transmitting units separately for feedback to the base station, thereby avoiding the situation that the UE cannot feed back the transmitting beam to the base station according to a division of the transmitting beams by the transmitting units when the UE does not know the correspondence between the transmitting units and the corresponding transmitting beams, so that the base station may have as many as possible more suitable combination schemes of the transmitting beam groups when obtaining the corresponding transmitting beam group in step S1001.

Optionally, the transmitting units of the base station may be the aforementioned base station, the transceiver panel on the base station, the TXRU on the transceiver panel of the base station, the radio frequency (RF) filter of the base station, or the spatial filter of the base station. The transmitting units of the base station may each transmit at least one transmitting beam simultaneously. In one example, the indication information of the transmitting beam may indicate the transmitting beam in various ways. For example, the indication information of the transmitting beam may indicate the transmitting beam through one or more of a beam index of the transmitting beam, a resource configuration index of the beam reference signal, and the spatial filters. Furthermore, the indication information of the transmitting beams possessed by one transmitting unit of the base station may be constructed inside one CSI-ResourceConfig shown in FIG. 11, or correspond to a plurality of CSI-ResourceConfigs, or may be constructed inside one resourceForChannelMeasurement, or correspond to a plurality of resourceForChannelMeasurements, and there is no limitation herein. Optionally, the indication information of the transmitting beams possessed by the at least one transmitting unit may further include the number of transmitting beams that the UE is desired to select for one or more transmitting units in the at least one transmitting unit, where the number of transmitting beams (or the maximum number of transmitting beams to be selected) to be selected by the UE may be configured for different transmitting units, and these numbers may be the same or different. For example, for each transmitting unit, the UE may be configured to select two transmitting beams; for another example, for one transmitting unit, the UE may be configured to select one transmitting beam, while for another transmitting unit, the UE may be configured to select 3 transmitting beams.

Furthermore, optionally, the information about the transmitting units may also include: repetition indication information, which is used to indicate whether the base station currently uses the same transmitting beams as the previous transmitting beams to transmit the information about the transmitting units for one or more transmitting units. The principle and application manner of the repetition indication information in the information about the transmitting units is similar to the repetition indication information in the measurement configuration information of the foregoing transmitting beam group, and details are not described herein again.

Correspondingly, the receiving the beam configuration information transmitted by the base station by using at least one transmitting beam group may also include: receiving the beam configuration information transmitted by the base station on the transmitting beam group formed by selecting one transmitting beam from the at least one transmitting unit respectively, according to the beam selection information. The base station may select one transmitting beam in each transmitting unit to form the transmitting beam group according to the beam selection information, or may select one transmitting beam in some of the transmitting units to form the transmitting beam group, which is not limited herein.

Figures 17, 18, 19:
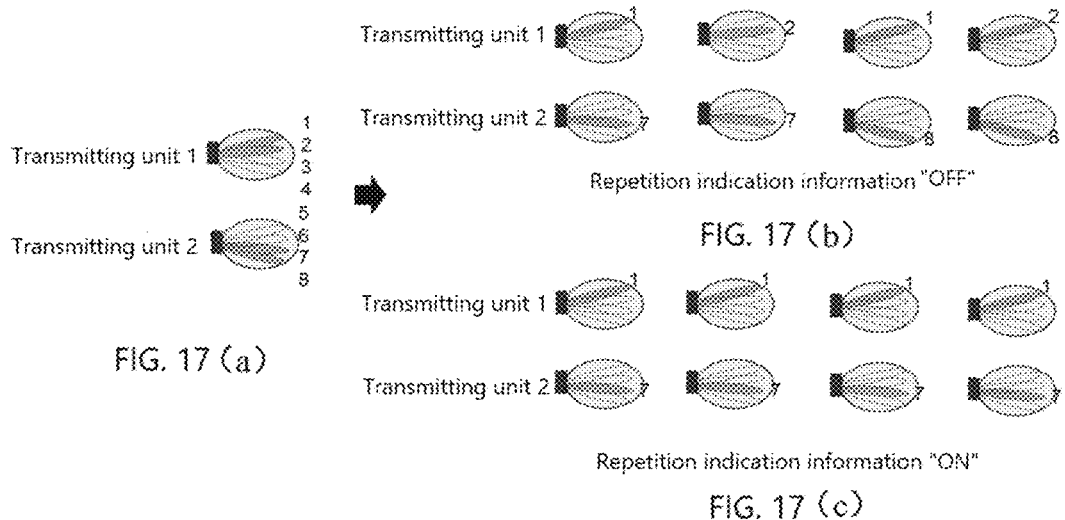
FIG. 18 shows an example of set report type parameters.
FIG. 19 shows an example of redefined parameters.

FIG. 17 illustrates an example of beam selection of a wireless communication method according to one embodiment of the present invention. Specifically, the base station first transmits the information about the transmitting units. In this example, assuming that the base station includes two transmitting units, and each unit has 4 transmitting beams, the information about the transmitting units may include an identification 1 of the transmitting unit and the indication information {1, 2, 3, 4} of the transmitting beams possessed by the transmitting unit, and an identification 2 of the transmitting unit and the indication information {5, 6, 7, 8} of the transmitting beams possessed by the transmitting unit. Subsequently, the UE selects the transmitting beams {1, 2} in the transmitting unit 1 and the transmitting beams {7, 8} in the transmitting unit 2 according to the information about the transmitting units transmitted by the base station, as shown in FIG. 17(a). And, the UE feeds back the selection result to the base station as the beam selection information. In one example, the UE may report the identification of the transmitting unit and the selected transmitting beams at the same time; in another example, considering that the indication information of the transmitting beams is different, the UE may also report only the selected transmitting beams. Optionally, the beam selection information may further include the channel feedback information corresponding to the selected transmitting beams.

Optionally, after receiving the beam selection information fed back by the UE, for different transmitting units 1 and 2, the base station may select one corresponding transmitting beam respectively according to the manner described above, thereby forming the transmitting beam group. For example, the base station may select the transmitting beam group including 1 & 7, 1 & 8, 2 & 7, 2 & 8 to transmit the beam configuration information. FIG. 17(b) shows an example in which the base station transmits the beam configuration information using the transmitting beam groups of 1 & 7, 1 & 8, 2 & 7, 2 & 8 separately. In this example, the repetition indication information in the beam configuration information may be "OFF". FIG. 17(c) shows an example in which the base station transmits the beam configuration information by using the transmitting beam group of 1 & 7. In this example, the repetition indication information in the beam configuration information may be "ON".

In yet another implementation of the present invention, feedback indication information transmitted by the base station may be received. According to the feedback indication information, transmitting beams corresponding to one or more receiving beams in at least one receiving unit of the user equipment are selected, and the beam selection information is transmitted to the base station, where the beam selection information indicates the transmitting beams selected by the user equipment. The beam selection information may include the identification of the at least one receiving unit and the indication information of the transmitting beams corresponding to one or more receiving beams in the at least one receiving unit. Optionally, the beam selection information may further include the channel feedback information corresponding to the transmitting beams. Specifically, the feedback indication information may include the number of the one or more receiving units to be selected, i.e. to be fed back by the UE, and/or the number of transmitting beams corresponding to the receiving beams of each receiving unit. According to the number, the UE may select one or more receiving beams from different receiving units respectively, and feed the indication information of the transmitting beams corresponding to the selected receiving beams back to the base station, so that the base station may have as many as possible combinations of the transmitting beam groups when obtaining the corresponding transmitting beam groups in step S1001. In one example, the number of the receiving beams selected by the UE from different receiving units and the number of the corresponding transmitting beams may be the same or different. For example, for each receiving unit, the UE may select 2 transmitting beams; for another example, for one receiving unit, the UE may select one transmitting beam, and for another receiving unit, the UE may select 3 transmitting beams. The number of one or more receiving units fed back by the UE and/or the number of beams selected for different receiving units may be set in advance and known by the UE and the base station, or may be configured by RRC signaling, or may be determined through the parameters such as UE capability information and the number of UE-side transceiver panels/receiving units/spatial filters and the like. For example, the base station may determine the number of receiving units fed back by the UE and/or the number of transmitting beams selected for different receiving units, according to the UE capability information, to ensure that the configured number does not exceed the capability of the UE.

Correspondingly, the receiving the beam configuration information transmitted by the base station by using at least one transmitting beam group may also include: receiving the beam configuration information transmitted by the base station on the transmitting beam group formed by selecting one transmitting beam from the at least one transmitting unit respectively, according to the beam selection information. The base station may select one transmitting beam in each transmitting unit to form the transmitting beam group according to the beam selection information, or may select one transmitting beam in some of the transmitting units to form the transmitting beam group, which is not limited herein.

Optionally, the receiving units of the UE may be the aforementioned UE, the transceiver panel on the UE, the TXRU on the UE transceiver panel, the radio frequency (RF) filter of the UE, or the spatial filter of the UE, and the like. Each receiving unit of the UE may receive at least one beam at the same time. In one example, the indication information of the transmitting beams corresponding to the receiving beams may indicate the transmitting beams in various ways. For example, the indication information of the transmitting beam may indicate the transmitting beam through one or more of a beam index of the transmitting beam, a resource configuration index of the beam reference signal, and the spatial filters. According to one example of the present invention, as shown in FIG. 18, the UE may transmit the beam selection information indicating the UE selection result according to a report type preset in, for example, 3GPP R-16. For example, FIG. 18 shows an example of the report type parameters newly set in 3GPP R-16. When groupBasedBeamReporting is enabled in FIG. 18, the UE may report the beam selection information. According to another example of the present invention, the UE may also transmit the beam selection information indicating the UE selection result according to the parameters redefined in the existing 3GPP R-15 standard. For example, FIG. 19 shows an example of the redefined parameters in 3GPP R-15. When the groupBasedBeamReporting redefined in FIG. 19 is enabled, it may be considered that the UE needs to report the beam selection information. Furthermore, for example, a parameter N redefined in the ENUMERATED item in FIG. 19 may also be used to correlate with the number of transmitting beams reported by the UE. FIG. 20 shows an example of beam selection in a wireless communication method according to one embodiment of the present invention. In FIG. 20, N=3 is assumed to indicate that the UE may report 3 groups of 6 beams. In this case, the UE will select 3 groups of transmitting beams that it may receive simultaneously. For example, the UE may select 3 groups of transmitting beams, which are {1,5}, {2,7}, and {4,8}, respectively. Accordingly, as shown in FIG. 20(a), the base station has transmitting beams {1,2,3,4} corresponding to the transmitting unit 1 and transmitting beams {5,6,7,8} corresponding to the transmitting unit 2, Then, the transmitting beams reported by the UE are transmitting beams {1,2,4} in the transmitting unit 1 and transmitting beams {5,7,8} in the transmitting unit 2. Subsequently, as shown in FIG. 20(b), the base station may select the transmitting beam group according to a distribution of the transmitting beams on the transmitting unit and the beams reported by the UE, for example, select the transmitting beam groups {1,5}, {2,7}, {4,8} to transmit the beam configuration information to maximize the channel transmission quality.

FIG. 21 illustrates an example of beam selection in a wireless communication method according to one embodiment of the present invention. In this example, the UE has two receiving units, the base station has two transmitting units, and each transmitting/receiving unit has two transmitting/receiving beams, respectively. First, the UE obtains the channel measurement results of L1-RSRP as shown in FIG. 21(a) according to its two receiving units and their corresponding beams. Subsequently, the UE may use the channel measurement results to determine the beam selection information, which indicates the transmitting beams corresponding to each receiving beam in each receiving unit selected by the user equipment. According to FIG. 21(a), according to the channel measurement results of L1-RSRP, the user equipment may select a transmitting beam 1 corresponding to a receiving beam 1 and a transmitting beam 2 corresponding to a receiving beam 2 of its receiving unit 1; in addition, the user equipment may also select a transmitting beam 4 corresponding to a receiving beam 3 and a transmitting beam 6 corresponding to a receiving beam 2 of its receiving unit 2. That is, corresponding to the receiving unit 1, the user equipment selects the transmitting beams {1,2}; and correspondingly to the receiving unit 2, the user equipment selects the transmitting beams {4,6}. Correspondingly, as shown in FIG. 21(b), corresponding to the transmitting unit 1 of the base station, the selected transmitting beams include {1,2, 4}; and corresponding to the transmitting unit 2 of the base station, the selected transmitting beams include {6}. Therefore, the base station may select one transmitting beam in each transmitting unit respectively to form the transmitting beam group according to the beam selection information of the user equipment. As shown in FIG. 21(c), the transmitting beam group may be {1,6} or {2, 6}.

By using the wireless communication method according to the embodiments of the present invention, it is possible to provide a specific signaling interaction scheme between the base station and the UE when selecting corresponding beams and formed beam groups for different transceiver units, so that the transmission quality of the wireless communication system is improved, the configuration of the channel transmission resources is optimized, and the resource overhead is reduced according to the signaling interaction and the selection process.

Figure 22:
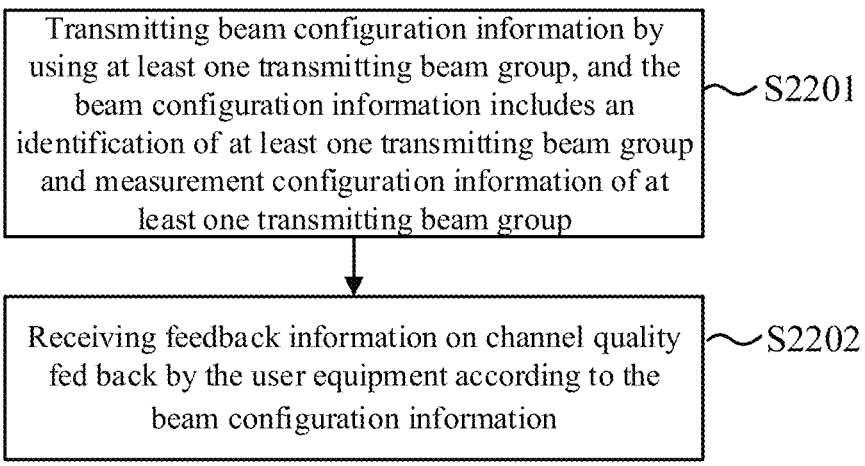
FIG. 22 shows a flowchart of a wireless communication method according to an embodiment of the present invention.

FIG. 22 shows a flowchart of a wireless communication method 2200 according to one embodiment of the present invention, and the method may be performed by a base station. Since many aspects of the method are the same as those described above for the UE, the description of the same aspects is omitted here or only briefly described.

As shown in FIG. 22, in step S2201, beam configuration information is transmitted by using at least one transmitting beam group, where the beam configuration information includes an identification of at least one transmitting beam group and measurement configuration information of at least one transmitting beam group.

In this step, the base station may select one or more transmitting beam groups from at least one transmitting beam group, and transmit the beam configuration information including the transmitting beam group identification and the measurement configuration information via the selected transmitting beam group. The at least one transmitting beam group may be one or more transmitting beam groups constructed by the beam selection methods described above. FIG. 11 shows a specific content example of CSI resource configuration according to the 3GPP standard TS 38.311. As shown in FIG. 11, an information element CSI-ReportConfig may include a plurality of CSI-ResourceConfigIds, where resources used for channel measurement resourceForChannelMeasurement may be indicated by CSI-ResourceConfigId, to represent reference signal (RS) configuration for channel measurement in the first later (L1). Further, as shown in the shaded block diagram on the right, the CSI-ResourceConfigId may further include CSI-ResourceConfig, and may include the measurement configuration information of a channel state information reference signal (CSI-RS) resource for indicating channel measurement resource and/or a synchronization signal block (SSB) resource, and so on. The transmitting beam group in the embodiment of the present invention may be constructed inside the above-mentioned one CSI-ResourceConfig, or may correspond to a plurality of CSI-ResourceConfigs, or may be constructed inside one resourceForChannelMeasurement, or may correspond to a plurality of resourceForChannelMeasurements, which is not limited herein. Optionally, the measurement configuration information of the transmitting beam group may include configuration information (or indication information) of at least one transmitting beam in the transmitting beam group of the base station, where the configuration information of the transmitting beam may indicate the transmitting beam in various ways. in a manner. For example, the indication information of the transmitting beam may indicate the transmitting beam through one or more of a beam index of the transmitting beam, a resource configuration index of a beam reference signal, and the spatial filter.

In an implementation, the measurement configuration information of the transmitting beam group may further include: repetition indication information. In one example, the repetition indication information may correspond to a certain transmitting beam group of the base station, to indicate whether the base station currently uses the same transmitting beam group (or spatial filter) for the transmitting beam group to transmit the beam configuration information. For example, when the repetition indication information is "ON" and corresponds to a transmitting beam group of the base station with an identification 1, the base station may be indicated to use the same transmitting beam currently as previous for the transmitting beam group to transmit the beam configuration information. At this time, the UE may perform a beam scan using a different receiving beam group than before to select a receiving beam group corresponding to the transmitting beam group whose identification is 1. When the repetition indication information is "OFF" and corresponds to the transmitting beam group of the base station with an identification 1, the base station may be indicated not to use the same transmitting beam currently as previous to transmit the beam configuration information for the transmitting beam group. At this time, the UE may keep the same the receiving beam group as before to receive the beam configuration information, and select the transmitting beam group corresponding to the receiving beam group. The repetition indication information may be set and used in the manner shown above, for example, with reference to FIG. 12, which will not be repeated here.

In another example, the repetition indication information may correspond to one or more transmitting units of the base station, to indicate whether the base station currently uses the same transmitting beam (or spatial filter) as previous for the one or more transmitting units to transmit the beam configuration information. For example, when the repetition indication information is "ON" and corresponds to a transmitting unit 1 of the base station, the base station may be indicated to use the same transmitting beam 1 currently as previous for the transmitting unit 1 to transmit the beam configuration information. At this time, for the transmitting unit 1, the UE may perform the beam scan using a different receiving beam group than before to select a receiving beam group corresponding to the transmitting beam 1. When the repetition indication information is "OFF" and corresponds to the transmitting unit 1 of the base station, the base station may be indicated to currently use a transmitting beam 2 different from the previous transmitting beam 1 to transmit the beam configuration information. At this time, the UE may keep the same the receiving beam group as before for reception, and select the transmitting beam corresponding to the receiving beam group. FIG. 13 shows a schematic diagram of the repetition indication information according to one embodiment of the present invention. FIG. 13(a) is a schematic diagram where the repetition indication information 1 and 2 correspond to the transmitting unit 1 and transmitting unit 2 of the base station, respectively, and the repetition indication information 1 and 2 are "ON" and "OFF", respectively. FIG. 13(b) is an example where the repetition indication information 1 and 2 correspond to the transmitting unit 1 and transmitting unit 2 of the base station, respectively, and both the repetition indication information 1 and 2 are "ON". As shown in FIG. 13(a), the repetition indication information 1 corresponds to the transmitting unit 1 of the base station and is always kept "ON". At this time, the base station always adopts the same transmitting beams as previous on this transmitting unit 1. The repetition indication information 2 corresponds to the transmitting unit 2 of the base station and is always kept "OFF". At this time, the base station always adopts the transmitting beams different from the previous transmitting beams on this transmitting unit 2. For this case, it means that the base station may always keep the same transmitting beam on the transmitting unit 1, and only perform scanning for the different transmitting beams on the transmitting unit 2. At this time, the UE may use the same receiving beam group for reception, and select the transmitting beam on the transmitting unit 2 corresponding to this receiving beam group. Alternatively, the UE may use the determined receiving beam of the receiving unit of the corresponding transmitting unit 1 and a beam group constructed by a same beam of the corresponding transmitting unit 2 to receive, so as to determine the transmitting beam on the transmitting unit 2 corresponding to this receiving beam group. As shown in FIG. 13(b), the repetition indication information 1 corresponds to the transmitting unit 1 of the base station, and is always kept "ON". At this time, the base station always transmits with the same transmitting beam on this transmitting beam group 1. The repetition indication information 2 corresponds to the transmitting unit 2 of the base station, and is always kept "ON". At this time, the base station also always transmits with the same transmitting beam on this transmitting beam group 2. This case means that the base station always uses the same transmitting beam group to transmit. At this time, the UE may use different receiving beam groups to perform beam scanning to select the receiving beam group corresponding to the transmitting beam group.

Optionally, the repetition indication information may use a value of one bit to indicate different states of "ON" or "OFF" thereof. For example, a bit with a value of 1 may be used to indicate "ON", and a bit with a value of 0 may be used to indicate "OFF"; conversely, a bit with a value of 0 may be used to indicate "ON", and a bit with a value of 1 may be used to indicate "OFF". The above various descriptions of the repetition indication information are merely examples. In practical applications, any representation manner of the repetition indication information may be adopted to represent the repetition of the transmitting beam group and/or the transmitting beam, which is not limited herein.

In one implementation, the beam configuration information transmitted by the base station may further include: the number of transmitting beam groups that the base station needs to receive the feedback information from user equipment; accordingly, the user equipment may feed the feedback information back according to a quantity defined by the beam configuration information. For example, the beam configuration information transmitted by the base station may include: the feedback information of 3 transmitting beam groups that need to be received from the user equipment, so that even if the user equipment receives beam configuration information transmitted by, for example, 5 transmitting beam groups, it is also possible to feed back only the feedback information corresponding to a maximum of three transmitting beam groups. As described above, the transmit beam group for feedback may be selected in different ways, which will not be repeated it here. Of course, the above feedback manners of the feedback information are only examples. In practical applications, the number of transmitting beam groups that the base station needs to receive the feedback information from the user equipment may be greater than, equal to, or less than the number of transmitting beam groups for transmitting the beam configuration information, which is not limited herein.

In one implementation, the measurement configuration information of the transmitting beam group may include a channel quality type measured by the user equipment, and thus, the user equipment may obtain feedback information of a corresponding type of channel quality according to the channel quality type. The type of the channel quality measured by the user equipment and indicated by the base station may be, for example, RSRQ, RSRP, SINR, RSSI, and the like. In one example, the type of channel quality measured by the user equipment and indicated by the base station may be RSRQ. In another example, the type of channel quality measured by the user equipment and indicated by the base station may be RSRP, for example, it may be an average RSRP corresponding to the transmitting beam group. In another example, the type of channel quality measured by the user equipment and indicated by the base station may be SINR, for example, it may be an average SINR corresponding to the transmitting beam group. Accordingly, in one example, the measurement configuration information of the transmitting beam group may further include measurement configuration information for indicating one or more reference signal strength measurements, for example, the measurement configuration information of the transmitting beam group may include the measurement configuration information of one or more CSI-RS strength measurements, or the measurement configuration information of one or more SSB strength measurements. In another example, the measurement configuration information of the transmitting beam group may further include: the measurement configuration information of RSSI corresponding to one or more CSI-RSs or SSBs and/or the measurement configuration information of interference strength.

In step S2202, the base station receives feedback information on channel quality fed back by the user equipment according to the beam configuration information.

In one implementation of the present invention, when the beam configuration information transmitted by the base station includes the number of transmit beam groups that the base station needs to receive the feedback information from the user equipment, the user equipment may feed back the feedback information according to the quantity defined by the beam configuration information.

In one implementation manner of the present invention, when the measurement configuration information of the transmitting beam group transmitted by the base station includes the channel quality type measured by the user equipment, the user equipment may obtain the feedback information of a corresponding channel quality type according to the channel quality type. As described above, the type of channel quality measured by the user equipment and indicated by the base station may be, for example, RSRQ, RSRP, SINR, RSSI, and the like.

In one example, the type of channel quality measured by the user equipment and indicated by the base station may be RSRP. Specifically, the UE may, for example, measure REs of one or more CSI-RSs or SSBs based on the measurement configuration information of the transmitting beam group transmitted by the base station, to obtain an average L1-RSRP corresponding to the transmitting beam group as the feedback information about the channel quality.

In another example, the type of channel quality measured by the user equipment and indicated by the base station may be RSRQ, for example, it may be an average RSRQ corresponding to the transmitting beam group. Specifically, the UE may obtain an average L1-RSRQ of the transmitting beam group based on the measurement configuration information of the transmitting beam group, for example, according to the L1-RSRQ obtained by measuring each reference signal configured in the transmitting beam group. For example, when the measurement configuration information of the transmitting beam group indicates that two reference signals are measured, an average value of a first L1-RSRQ and a second L1-RSRQ obtained may be used to obtain the average L1-RSRQ of the transmitting beam group. The L1-RSRQ of each reference signal may be obtained by measuring the strength of the reference signal and measuring the RSSI. At this time, the measurement configuration information of the transmitting beam group may include measurement configuration information for indicating a reference signal strength measurement. For example, the measurement configuration information of the transmitting beam group may include measurement configuration information indicating CSI-RS strength measurement, or measurement configuration information indicating SSB strength measurement. In addition, optionally, the RSSI may be a total energy strength received on reference signal resource elements or resource elements over an entire bandwidth of a time symbol where the reference signal resource elements are located, or a reference signal configuration of a plurality of reference signal configurations within the transmitting beam group may be received as the interference strength measurement configuration of the reference signal using the same receiving beam. For example, the measurement configuration information of the transmitting beam group may also be explicitly configured with: the measurement configuration information of the receiving signal strength indication of at least one transmitting beam in the transmitting beam group and/or the measurement configuration information of the interference strength. Accordingly, the feeding back the channel quality feedback information according to the beam configuration information may include: obtaining a reference signal received quality of the transmitting beam group according to the measurement configuration information of the receiving signal strength indication and/or the measurement configuration information of the interference strength. For another example, the feeding back of the channel quality feedback information according to the beam configuration information may further include: obtaining the reference signal received quality of the transmitting beam group according to a preset configuration. The preset configuration may be configured implicitly. In one example, the preset configuration of the reference signal received quality corresponding to the transmitting beam group obtained according to the receiving signal strength indication and/or the interference strength may be pre-configured on both sides of the UE and the base station; it may also be pre-configured to the base station and notified to the UE in advance through signaling; or it may be pre-configured to the UE and reported to the base station through signaling. The measurement configuration information content and various preset configuration methods described above are merely examples. In practical applications, the any measurement configuration information content and preset configuration methods may be adopted, and are not limited herein.

In yet another example, the type of channel quality measured by the user equipment and indicated by the base station may be SINR, for example, it may be an average SINR corresponding to the transmitting beam group. Specifically, the UE may obtain an average L1-SINR of the transmitting beam group based on the measurement configuration information of the transmitting beam group, for example, according to the L1-SINR obtained by measuring each reference signal configured in the transmitting beam group. For example, when the measurement configuration information of the transmitting beam group indicates that two reference signals are measured, an average value of a first L1-SINR and a second L1-SINR obtained may be used to obtain the average L1-SINR of the transmitting beam group. The L1-SINR of each reference signal may be obtained by measuring the strength of the reference signal and measuring the interference strength. At this time, the measurement configuration information of the transmitting beam group may include measurement configuration information for indicating one or more (for example, two) reference signal strength measurements. For example, the measurement configuration information of the transmitting beam group may include measurement configuration information indicating CSI-RS strength measurement, or measurement configuration information indicating SSB strength measurement. For example, the measurement configuration information of the transmitting beam group may also be explicitly configured with: the measurement configuration information of the interference strength; correspondingly, feeding back the feedback information about the channel quality according to the beam configuration information may include: obtaining a signal-to-interference and noise ratio of the transmitting beam group according to the measurement configuration information of the interference strength. For another example, the feeding back of the channel quality feedback information according to the beam configuration information may further include: obtaining the signal-to-interference and noise ratio of the transmitting beam group according to a preset configuration. The preset configuration may be configured implicitly. In one example, the preset configuration of the signal-to-interference and noise ratio corresponding to the transmitting beam group obtained according to the interference strength may be pre-configured on both sides of the UE and the base station; it may also be pre-configured to the base station and notified to the UE in advance through signaling; or it may be pre-configured to the UE and reported to the base station through signaling. For example, as an example of an implicit configuration, it may be configured such that the interference corresponding to a certain reference signal in the transmitting beam group may be measured by measuring the interference received on the reference signal resource elements, or the interference received on the entire bandwidth of the time symbol where the reference signal resource elements are located, or by receiving the interference at the position of another reference signal element within the transmitting beam group using the same receiving beam. The measurement configuration information content and various preset configuration methods described above are merely examples. In practical applications, the any measurement configuration information content and preset configuration methods may be adopted, and are not limited herein.

The UE may measure the reference signal strength in the manner described above with reference to FIG. 14. Alternatively, the UE may measure the reference signal strength and the interference strength in the manner described above with reference to FIG. 15. Alternatively, the UE may measure the reference signal strength and the receiving signal strength indication in the manner described above with reference to FIG. 16. Thereby, a channel quality measurement result of the transmitting beam group of the base station may be obtained, and the result is fed back to the base station.

In the embodiment of the present invention, after receiving the feedback information, the base station may select one or more transmitting beam groups among the at least one transmitting beam group according to the received feedback information on channel quality. Specifically, the feedback information may be associated with one or more transmitting beam groups in the at least one transmitting beam group, so that the feedback information may further include an identification of the one or more transmitting beam groups. For example, the feedback information reported by the UE may include, for example, an identification 1 of the transmitting beam group and its corresponding channel quality feedback information. As described above, the type of channel quality measured by the user equipment and indicated by the base station may be, for example, RSRQ, RSRP, SINR, RSSI, and so the like. In one example, the feedback information fed back by the UE may include one or more of the following feedback information: transmitting beam group identification_RSRP (or, CSI_transmitting beam group identification_RSRP and/or SSB_transmitting beam group identification_RSRP), transmitting beam group identificatio)_RSRQ/SINR (or, CSI_transmitting beam group identification_RSRQ/SINR and/or SSB_transmitting beam group identification_RSRQ/SINR. Here, RSRQ means user feedback RSRQ, SINR means user feedback SINR, RSRQ/SINR means one or all of user feedback RSRQ and SINR), transmitting beam group identification_RSRP_RSRQ/SINR (or, CSI_transmitting beam group identification_RSRP_RSRQ/SINR and/or SSB_transmitting beam group identification_RSRP_RSRQ/SINR. Here, RSRP_RSRQ means that the user feeds back both RSRP and RSRQ simultaneously). The above feedback information of the UE is only an example. In practical applications, the UE may use any feedback information about the channel quality obtained according to the beam configuration information for feedback, which is not limited herein. In addition, when the user feeds back the signal quality measurement results RSRQ, RSRP, SINR, or RSSI of a plurality of transmitting beam groups, a plurality of absolute values of these results may be fed back, or the absolute channel quality measurement results may be fed back for the optimal transmitting beam group (for example, the transmitting beam group with the best channel quality), while the relative difference to the absolute channel quality measurement results of the optimal transmitting beam group are fed back for other transmitting beam groups.

The steps of the wireless communication method performed by the base station according to the embodiment of the present invention are described above. In another implementation of the present invention, information about the transmitting units may also be transmitted, where the information about the transmitting units indicates an identification of at least one transmitting unit and the indication information of the transmitting beams possessed by the at least one transmitting unit, such that the user equipment selects one or more transmitting beams in the at least one transmitting unit according to the information about the transmitting units and feeds back beam selection information indicating the user equipment selection result. The beam selection information may include the identification of the at least one transmitting unit, indication information of the transmitting beams selected in the transmitting unit, and/or channel feedback information corresponding to the selected transmitting beams. Specifically, according to the information transmitted by the base station about the transmitting unit, the base station may let the UE know about the number of transmitting units of the base station, the identifications of the transmitting units, and the possessed transmitting beams, so that the UE may select one or more transmitting beams from different transmitting units separately for feedback to the base station, thereby avoiding the situation that the UE cannot feed back the transmitting beam to the base station according to a division of the transmitting beams by the transmitting units when the UE does not know the correspondence between the transmitting units and the corresponding transmitting beams, so that the base station may have as many as possible combination schemes of the transmitting beam groups when determining the transmitting beam group in step S2201.

Optionally, the transmitting units of the base station may be the aforementioned base station, the transceiver panel on the base station, the TXRU on the transceiver panel of the base station, the radio frequency (RF) filter of the base station, or the spatial filter of the base station. The transmitting units of the base station may each transmit at least one transmitting beam simultaneously. In one example, the indication information of the transmitting beam may indicate the transmitting beam in various ways. For example, the indication information of the transmitting beam may indicate the transmitting beam through one or more of a beam index of the transmitting beam, a resource configuration index of the beam reference signal, and the spatial filters. Furthermore, the indication information of the transmitting beams possessed by one transmitting unit of the base station may be constructed inside one CSI-ResourceConfig shown in FIG. 11, or correspond to a plurality of CSI-ResourceConfigs, or may be constructed inside one resourceForChannelMeasurement, or correspond to a plurality of resourceForChannelMeasurements, and there is no limitation herein. Optionally, the indication information of the transmitting beams possessed by the at least one transmitting unit may further include the number of transmitting beams that the UE is desired to select for one or more transmitting units in the at least one transmitting unit, where the number of transmitting beams (or the maximum number of transmitting beams to be selected) to be selected by the UE may be configured for different transmitting units, and these numbers may be the same or different.

Furthermore, optionally, the information about the transmitting units may also include: repetition indication information, which is used to indicate whether the base station currently uses the same transmitting beams as the previous transmitting beams to transmit the information about the transmitting units for one or more transmitting units. The principle and application manner of the repetition indication information in the information about the transmitting units is similar to the repetition indication information in the measurement configuration information of the foregoing transmitting beam group, and details are not described herein again.

Correspondingly, the beam configuration information transmitted by using at least one transmitting beam group includes: selecting one transmitting beam respectively among at least one transmitting unit to form the beam configuration information of the transmitting beam groups according to the beam selection information fed back by the user equipment. The base station may select one transmitting beam in each transmitting unit to form the transmitting beam group according to the beam selection information, or may select one transmitting beam in some of the transmitting units to form the transmitting beam group, which is not limited herein.

FIG. 17 illustrates an example of beam selection of a wireless communication method according to one embodiment of the present invention. Specifically, the base station first transmits the information about the transmitting units. In this example, assuming that the base station includes two transmitting units, and each unit has 4 transmitting beams, the information about the transmitting units may include an identification 1 of the transmitting unit and the indication information {1,2,3,4} of the transmitting beams possessed by the transmitting unit, and an identification 2 of the transmitting unit and the indication information {5,6,7,8} of the transmitting beams possessed by the transmitting unit. Subsequently, the UE selects the transmitting beams {1,2} in the transmitting unit 1 and the transmitting beams {7,8} in the transmitting unit 2 according to the information about the transmitting units transmitted by the base station, as shown in FIG. 17(a). And, the UE feeds back the selection result to the base station as the beam selection information. In one example, the UE may report the identification of the transmitting unit and the selected transmitting beams at the same time; in another example, considering that the indication information of the transmitting beams is different, the UE may also report only the selected transmitting beams. Optionally, the beam selection information may further include the channel feedback information corresponding to the selected transmitting beams.

Optionally, after receiving the beam selection information fed back by the UE, for different transmitting units 1 and 2, the base station may select one corresponding transmitting beam respectively, thereby forming the transmitting beam group. For example, the base station may select the transmitting beam group including 1 & 7, 1 & 8, 2 & 7, 2 & 8 to transmit the beam configuration information. FIG. 17(b) shows an example in which the base station transmits the beam configuration information using the transmitting beam groups of 1 & 7, 1 & 8, 2 & 7, 2 & 8 separately. In this example, the repetition indication information in the beam configuration information may be "OFF". FIG. 17(c) shows an example in which the base station transmits the beam configuration information by using the transmitting beam group of 1 & 7. In this example, the repetition indication information in the beam configuration information may be "ON".

In another implementation manner of the present invention, the base station may transmit feedback indication information to the user equipment, and receive beam selection information indicating the user equipment selection result transmitted by the user equipment. The beam selection information indicates the transmitting beams corresponding to one or more receiving beams in at least one receiving unit of the user equipment selected by the user equipment according to the feedback indication information. The feedback indication information may include the number of the one or more receiving units to be selected, i.e. to be fed back by the UE, and/or the number of transmitting beams corresponding to the receiving beams of each receiving unit. The beam selection information may include the identification of the at least one receiving unit and the indication information of the transmitting beams corresponding to one or more receiving beams in the at least one receiving unit. Optionally, the beam selection information may further include the channel feedback information corresponding to the transmitting beams. Specifically, the UE may select one or more receiving beams from different receiving units respectively, and feed the indication information of the transmitting beams corresponding to the selected receiving beams back to the base station, so that the base station may have as many as possible combinations of the transmitting beam groups when determining the corresponding transmitting beam groups in step S2201. In one example, the number of the receiving beams selected by the UE from different receiving units and the number of the corresponding transmitting beams may be the same or different. For example, for each receiving unit, the UE may select 2 transmitting beams; for another example, for one receiving unit, the UE may select one transmitting beam, and for another receiving unit, the UE may select 3 transmitting beams. The number of receiving units fed back by the UE and/or the number of beams selected for different receiving units may be set in advance and known by the UE and the base station, or may be configured by RRC signaling, or may be determined through the parameters such as UE capability information and the number of UE-side transceiver panels/receiving units/spatial filters and the like. For example, the base station may determine the number of one or more receiving units fed back by the UE and/or the number of transmitting beams selected for different receiving units, according to the UE capability information, to ensure that the configured number does not exceed the capability of the UE.

Correspondingly, transmitting the beam configuration information by using at least one transmitting beam group includes: selecting one transmitting beam from the at least one transmitting unit respectively to form the beam configuration information transmitted by the transmitting beam group, according to the beam selection information transmitted by the user equipment. The base station may select one transmitting beam in each transmitting unit to form the transmitting beam group according to the beam selection information, or may select one transmitting beam in some of the transmitting units to form the transmitting beam group, which is not limited herein.

Optionally, the receiving units of the UE may be the aforementioned UE, the transceiver panel on the UE, the TXRU on the UE transceiver panel, the radio frequency (RF) filter of the UE, or the spatial filter of the UE, and the like. Each receiving unit of the UE may receive at least one beam at the same time. In one example, the indication information of the transmitting beams corresponding to the receiving beams may indicate the transmitting beams in various ways. For example, the indication information of the transmitting beam may indicate the transmitting beam through one or more of a beam index of the transmitting beam, a resource configuration of the beam reference signal, and the spatial filters. According to one example of the present invention, as described above, the UE may transmit the beam selection information indicating the UE selection result according to a report type preset in, for example, 3GPP R-16. According to another example of the present invention, the UE may also transmit the beam selection information indicating the UE selection result according to the parameters redefined in the existing 3GPP R-15 standard.

FIG. 21 illustrates an example of beam selection in a wireless communication method according to one embodiment of the present invention. In this example, the UE has two receiving units, the base station has two transmitting units, and each transmitting/receiving unit has two transmitting/receiving beams, respectively. First, the UE obtains the channel measurement results of L1-RSRP as shown in FIG. 21(a) according to its two receiving units and their corresponding beams. Subsequently, the UE may use the channel measurement results to determine the beam selection information, which indicates the transmitting beams corresponding to each receiving beam in each receiving unit selected by the user equipment. According to FIG. 21(a), according to the channel measurement results of L1-RSRP, the user equipment may select a transmitting beam 1 corresponding to a receiving beam 1 and a transmitting beam 2 corresponding to a receiving beam 2 of its receiving unit 1; in addition, the user equipment may also select a transmitting beam 4 corresponding to a receiving beam 3 and a transmitting beam 6 corresponding to a receiving beam 2 of its receiving unit 2. That is, corresponding to the receiving unit 1, the user equipment selects the transmitting beams {1,2}; and corresponding to the receiving unit 2, the user equipment selects the transmitting beams {4,6}. Correspondingly, as shown in FIG. 21(b), corresponding to the transmitting unit 1 of the base station, the selected transmitting beams include {1,2, 4}; and corresponding to the transmitting unit 2 of the base station, the selected transmitting beams include {6}. Therefore, the base station may select one transmitting beam in each transmitting unit respectively to form the transmitting beam group according to the beam selection information of the user equipment. As shown in FIG. 21(c), the transmitting beam group may be {1,6} or {2, 6}.

By using the wireless communication method according to the embodiments of the present invention, it is possible to provide a specific signaling interaction scheme between the base station and the UE when selecting corresponding beams and formed beam groups for different transceiver units, so that the transmission quality of the wireless communication system is improved, the configuration of the channel transmission resources is optimized, and the resource overhead is reduced according to the signaling interaction and the selection process.

The user equipment according to the embodiments of the present application is described below with reference to FIG. 23. The user equipment may perform the wireless communication method described above. Since the operation of the user equipment is basically the same as each step of the wireless communication method described above, only a brief description will be given here, and repeated description of the same content will be omitted.

Figure 23:
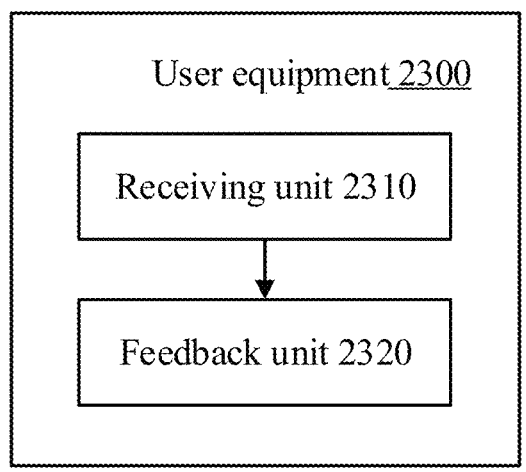
FIG. 23 shows a structural block diagram of a user equipment according to an embodiment of the present invention.

As shown in FIG. 23, the user equipment 2300 includes a receiving unit 2310 and a feedback unit 2320. It should be recognized that FIG. 23 only shows components related to the embodiments of the present application, and other components are omitted, but this is only schematic. According to requirements, the user equipment 2300 may include other components.

The receiving unit 2310 receives beam configuration information transmitted by a base station using at least one transmitting beam group, where the beam configuration information includes an identification of the at least one transmitting beam group and measurement configuration information of the at least one transmitting beam group.

The base station may select one or more transmitting beam groups from at least one transmitting beam group, and transmit the beam configuration information including the transmitting beam group identification and the measurement configuration information via the selected transmitting beam group. The at least one transmitting beam group may be one or more transmitting beam groups constructed by the beam selection methods described above. Correspondingly, the receiving unit 2310 may receive the beam configuration information transmitted by the base station using at least one transmitting beam group.

As described above, the transmitting beam group in the embodiment of the present invention may be constructed inside the above-mentioned one CSI-ResourceConfig, or may correspond to a plurality of CSI-ResourceConfigs, or may be constructed inside one resourceForChannelMeasurement, or may correspond to a plurality of resourceForChannelMeasurements, which is not limited herein. Optionally, the measurement configuration information of the transmitting beam group may include configuration information (or indication information) of at least one transmitting beam in the transmitting beam group, where the configuration information of the transmitting beam may indicate the transmitting beam in various ways. For example, the indication information of the transmitting beam may indicate the transmitting beam through one or more of a beam index of the transmitting beam, a resource configuration index of a beam reference signal, and the spatial filter.

In an implementation, the measurement configuration information of the transmitting beam group may further include: repetition indication information. In one example, the repetition indication information may correspond to a certain transmitting beam group of the base station, to indicate whether the base station currently uses the same transmitting beam (or spatial filter) as previous for the transmitting beam group to transmit the beam configuration information. For example, when the repetition indication information is "ON" and corresponds to a transmitting beam group of the base station with an identification 1, the base station may be indicated to use the same transmitting beam currently as previous for the transmitting beam group to transmit the beam configuration information. At this time, the UE may perform a beam scan using a different receiving beam group than before to select a receiving beam group corresponding to the transmitting beam group whose identification is 1. When the repetition indication information is "OFF" and corresponds to the transmitting beam group of the base station with an identification 1, the base station may be indicated not to use the same transmitting beam currently as previous to transmit the beam configuration information for the transmitting beam group. At this time, the UE may keep the same the receiving beam group as before to receive the beam configuration information, and select the transmitting beam group corresponding to the receiving beam group.

In another example, the repetition indication information may correspond to one or more transmitting units of the base station, to indicate whether the base station currently uses the same transmitting beam as previous for the one or more transmitting units to transmit the beam configuration information. For example, when the repetition indication information is "ON" and corresponds to a transmitting unit 1 of the base station, the base station may be indicated to use the same transmitting beam 1 currently as previous for the transmitting unit 1 to transmit the beam configuration information. At this time, for the transmitting unit 1, the UE may perform the beam scan using a different receiving beam group than before to select a receiving beam corresponding to the transmitting beam 1. When the repetition indication information is "OFF" and corresponds to the transmitting unit 1 of the base station, the base station may be indicated to currently use a transmitting beam 2 different from the previous transmitting beam 1 to transmit the beam configuration information. At this time, the UE may keep the same the receiving beam group as before for reception, and select the transmitting beam corresponding to the receiving beam group.

Optionally, the repetition indication information may use a value of one bit to indicate different states of "ON" or "OFF" thereof. For example, a bit with a value of 1 may be used to indicate "ON", and a bit with a value of 0 may be used to indicate "OFF"; conversely, a bit with a value of 0 may be used to indicate "ON", and a bit with a value of 1 may be used to indicate "OFF". The above various descriptions of the repetition indication information are merely examples. In practical applications, any representation manner of the repetition indication information may be adopted to represent the repetition of the transmitting beam group and/or the transmitting beam, which is not limited herein.

In one implementation, the beam configuration information transmitted by the base station may further include: the number of transmitting beam groups that the base station needs to receive the feedback information from user equipment; accordingly, the user equipment may feed the feedback information back according to a quantity defined by the beam configuration information. For example, the beam configuration information transmitted by the base station may include: the feedback information of 3 transmitting beam groups that need to be received from the user equipment, so that even if the user equipment receives beam configuration information transmitted by, for example, 5 transmitting beam groups, it is also possible to feed back only the feedback information corresponding to a maximum of three transmitting beam groups. As described above, the transmitting beam groups to which the feedback is directed may be selected in different ways, which will not be repeated here. Of course, the above feedback manners of the feedback information are only examples. In practical applications, the number of transmitting beam groups that the base station needs to receive the feedback information from the user equipment may be greater than, equal to, or less than the number of transmitting beam groups for transmitting the beam configuration information, which is not limited herein.

In one implementation, the measurement configuration information of the transmitting beam group may include a channel quality type measured by the user equipment, and thus, the user equipment may obtain feedback information of a corresponding type of channel quality according to the channel quality type. As described above, the type of the channel quality measured by the user equipment and indicated by the base station may be, for example, RSRQ, RSRP, SINR, RSSI, and the like. In one example, the type of channel quality measured by the user equipment and indicated by the base station may be RSRQ. In another example, the type of channel quality measured by the user equipment and indicated by the base station may be RSRP, for example, it may be an average RSRP corresponding to the transmitting beam group. In another example, the type of channel quality measured by the user equipment and indicated by the base station may be SINR, for example, it may be an average SINR corresponding to the transmitting beam group. Accordingly, in one example, the measurement configuration information of the transmitting beam group may further include measurement configuration information for indicating one or more reference signal strength measurements, for example, the measurement configuration information of the transmitting beam group may include the measurement configuration information of one or more channel state information reference signal (CSI-RS) strength measurements, or the measurement configuration information of one or more SSB strength measurements. In another example, the measurement configuration information of the transmitting beam group may further include: the measurement configuration information of RSSI corresponding to one or more CSI-RSs or SSBs and/or the measurement configuration information of interference strength.

The feedback unit 2320 may feed back the feedback information about the channel quality according to the beam configuration information.

In one implementation of the present invention, when the beam configuration information transmitted by the base station includes the number of transmit beam groups that the base station needs to receive the feedback information from the user equipment, the feedback unit 2320 may feed back the feedback information according to the quantity defined by the beam configuration information In one implementation manner of the present invention, when the measurement configuration information of the transmitting beam group transmitted by the base station includes the channel quality type measured by the user equipment, the user equipment may obtain the feedback information of a corresponding channel quality type according to the channel quality type. As described above, the type of channel quality measured by the user equipment and indicated by the base station may be, for example, RSRQ, RSRP, SINR, RSSI, and the like.

In one example, the type of channel quality measured by the user equipment and indicated by the base station may be RSRP. Specifically, the UE may, for example, measure REs of one or more CSI-RSs or SSBs based on the measurement configuration information of the transmitting beam group transmitted by the base station, to obtain an average L1-RSRP corresponding to the transmitting beam group as the feedback information about the channel quality In another example, the type of channel quality measured by the user equipment and indicated by the base station may be RSRQ, for example, it may be an average RSRQ corresponding to the transmitting beam group. Specifically, the feedback unit 2320 may obtain an average L1-RSRQ of the transmitting beam group based on the measurement configuration information of the transmitting beam group, for example, according to the L1-RSRQ obtained by measuring each reference signal configured in the transmitting beam group. For example, when the measurement configuration information of the transmitting beam group indicates that two reference signals are measured, an average value of a first L1-RSRQ and a second L1-RSRQ obtained may be used to obtain the average L1-RSRQ of the transmitting beam group. The L1-RSRQ of each reference signal may be obtained by measuring the strength of the reference signal and measuring the RSSI. At this time, the measurement configuration information of the transmitting beam group may include measurement configuration information for indicating a reference signal strength measurement. For example, the measurement configuration information of the transmitting beam group may include measurement configuration information indicating CSI-RS strength measurement, or measurement configuration information indicating SSB strength measurement. In addition, optionally, the RSSI may be a total energy strength received on reference signal resource elements or resource elements over an entire bandwidth of a time symbol where the reference signal resource elements are located, or a reference signal configuration of a plurality of reference signal configurations within the transmitting beam group may be received as the interference strength measurement configuration of the reference signal using the same receiving beam. For example, the measurement configuration information of the transmitting beam group may also be explicitly configured with: the measurement configuration information of the receiving signal strength indication of at least one transmitting beam in the transmitting beam group and/or the measurement configuration information of the interference strength. Accordingly, the feeding back the channel quality feedback information according to the beam configuration information may include: obtaining a reference signal received quality of the transmitting beam group according to the measurement configuration information of the receiving signal strength indication and/or the measurement configuration information of the interference strength. For another example, the feeding back of the channel quality feedback information according to the beam configuration information may further include: obtaining the reference signal received quality of the transmitting beam group according to a preset configuration. The preset configuration may be configured implicitly. In one example, the preset configuration of the reference signal received quality corresponding to the transmitting beam group obtained according to the receiving signal strength indication and/or the interference strength may be pre-configured on both sides of the UE and the base station; it may also be pre-configured to the base station and notified to the UE in advance through signaling; or it may be pre-configured to the UE and reported to the base station through signaling. The measurement configuration information content and various preset configuration methods described above are merely examples. In practical applications, the any measurement configuration information content and preset configuration methods may be adopted, and are not limited herein.

In yet another example, the type of channel quality measured by the user equipment and indicated by the base station may be SINR, for example, it may be an average SINR corresponding to the transmitting beam group. Specifically, the UE may obtain an average L1-SINR of the transmitting beam group based on the measurement configuration information of the transmitting beam group, for example, according to the L1-SINR obtained by measuring each reference signal configured in the transmitting beam group. For example, when the measurement configuration information of the transmitting beam group indicates that two reference signals are measured, an average value of a first L1-SINR and a second L1-SINR obtained may be used to obtain the average L1-SINR of the transmitting beam group. The L1-SINR of each reference signal may be obtained by measuring the strength of the reference signal and measuring the interference strength. At this time, the measurement configuration information of the transmitting beam group may include measurement configuration information for indicating one or more (for example, two) reference signal strength measurements. For example, the measurement configuration information of the transmitting beam group may include measurement configuration information indicating CSI-RS strength measurement, or measurement configuration information indicating SSB strength measurement. For example, the measurement configuration information of the transmitting beam group may also be explicitly configured with: the measurement configuration information of the interference strength; correspondingly, feeding back the feedback information about the channel quality according to the beam configuration information may include: obtaining a signal-to-interference and noise ratio of the transmitting beam group according to the measurement configuration information of the interference strength. For another example, the feeding back of the channel quality feedback information according to the beam configuration information may further include: obtaining the signal-to-interference and noise ratio of the transmitting beam group according to a preset configuration. The preset configuration may be configured implicitly. In one example, the preset configuration of the signal-to-interference and noise ratio corresponding to the transmitting beam group obtained according to the interference strength may be pre-configured on both sides of the UE and the base station; it may also be pre-configured to the base station and notified to the UE in advance through signaling; or it may be pre-configured to the UE and reported to the base station through signaling. For example, as an example of an implicit configuration, it may be configured such that the interference corresponding to a certain reference signal in the transmitting beam group may be measured by measuring the interference received on the reference signal resource elements, or the interference received on the entire bandwidth of the time symbol where the reference signal resource elements are located, or by receiving the interference at the position of another reference signal element within the transmitting beam group using the same receiving beam. The measurement configuration information content and various preset configuration methods described above are merely examples. In practical applications, the any measurement configuration information content and preset configuration methods may be adopted, and are not limited herein.

As described above, the feedback unit may measure the reference signal strength in the manner shown in FIG. 14. Alternatively, the feedback unit may measure the reference signal strength and the interference strength in the manner shown in FIG. 15. Alternatively, the feedback unit may measure the reference signal strength and the receiving signal strength indication in the manner shown in FIG. 16. Thereby, a channel quality measurement result of the transmitting beam of the base station may be obtained.

In the embodiments of the present invention, after obtaining the feedback information about the channel quality according to the beam configuration information, the feedback unit 2320 may feed back the feedback information to the base station, so that the base station selects one or more transmitting beam groups among the at least one transmitting beam group according to the feedback information. Specifically, the feedback information may be associated with one or more transmitting beam groups in the at least one transmitting beam group, so that the feedback information may further include an identification of the one or more transmitting beam groups. For example, the feedback information reported by the UE may include, for example, an identification 1 of the transmitting beam group and its corresponding channel quality feedback information. As described above, the type of channel quality measured by the user equipment and indicated by the base station may be, for example, RSRQ, RSRP, SINR, RSSI, and so the like. In one example, the feedback information fed back by the UE may include one or more of the following feedback information: transmitting beam group identification_RSRP (or, CSI_transmitting beam group identification_RSRP and/or SSB_transmitting beam group identification_RSRP), transmitting beam group identificatio)_RSRQ/SINR (or, CSI_transmitting beam group identification_RSRQ/SINR and/or SSB_transmitting beam group identification_RSRQ/SINR. Here, RSRQ means user feedback RSRQ, SINR means user feedback SINR, RSRQ/SINR means one or all of user feedback RSRQ and SINR), transmitting beam group identification_RSRP_RSRQ/SINR (or, CSI_transmitting beam group identification_RSRP_RSRQ/SINR and/or SSB_transmitting beam group identification_RSRP_RSRQ/SINR. Here, RSRP_RSRQ means that the user feeds back both RSRP and RSRQ simultaneously). The above feedback information of the feedback unit 2320 is only an example. In practical applications, the feedback unit 2320 may use any feedback information about the channel quality obtained according to the beam configuration information for feedback, which is not limited herein. In addition, when the feedback unit 2320 feeds back the signal quality measurement results RSRQ, RSRP, SINR, or RSSI of a plurality of transmitting beam groups, a plurality of absolute values of these results may be fed back, or the absolute channel quality measurement results may be fed back for the optimal transmitting beam group (for example, the transmitting beam group with the best channel quality), while the relative difference to the absolute channel quality measurement results of the optimal transmitting beam group are fed back for other transmitting beam groups.

The user equipment 2300 according to the embodiments of the present invention are described above. In another implementation of the present invention, Before the receiving unit 2310 receives the beam configuration information transmitted by the base station using at least one transmitting beam group, it may also receive information transmitted by the base station about the transmitting units, where the information about the transmitting units indicates an identification of at least one transmitting unit and the indication information of the transmitting beams possessed by the at least one transmitting unit. According to the information about the transmitting units, one or more transmitting beams in the at least one transmitting unit are selected, and beam selection information indicating the user equipment selection result is fed back. The beam selection information may include the identification of the at least one transmitting unit, indication information of the transmitting beams selected in the transmitting unit, and/or channel feedback information corresponding to the selected transmitting beams. Specifically, according to the information transmitted by the base station about the transmitting unit, the base station may let the UE know about the number of transmitting units of the base station, the identifications of the transmitting units, and the possessed transmitting beams, so that the UE may select one or more transmitting beams from different transmitting units separately for feedback to the base station, thereby avoiding the situation that the UE cannot feed back the transmitting beam to the base station according to a division of the transmitting beams by the transmitting units when the UE does not know the correspondence between the transmitting units and the corresponding transmitting beams, so that the base station may have as many as possible combination schemes of the transmitting beam groups when obtaining the transmitting beam group.

Optionally, the transmitting units of the base station may be the aforementioned base station, the transceiver panel on the base station, the TXRU on the transceiver panel of the base station, the radio frequency (RF) filter of the base station, or the spatial filter of the base station. The transmitting units of the base station may each transmit at least one transmitting beam simultaneously. In one example, the indication information of the transmitting beam may indicate the transmitting beam in various ways. For example, the indication information of the transmitting beam may indicate the transmitting beam through one or more of a beam index of the transmitting beam, a resource configuration of the beam reference signal, and the spatial filters. Furthermore, the indication information of the transmitting beams possessed by one transmitting unit of the base station may be constructed inside one CSI-ResourceConfig shown in FIG. 11, or correspond to a plurality of CSI-ResourceConfigs, or may be constructed inside one resourceForChannelMeasurement, or correspond to a plurality of resourceForChannelMeasurements, and there is no limitation herein. Optionally, the indication information of the transmitting beams possessed by the at least one transmitting unit may further include the number of transmitting beams that the UE is desired to select for one or more transmitting units in the at least one transmitting unit, where the number of transmitting beams (or the maximum number of transmitting beams to be selected) to be selected by the UE may be configured for different transmitting units, and these numbers may be the same or different.

Furthermore, optionally, the information about the transmitting units may also include: repetition indication information, which is used to indicate whether the base station currently uses the same transmitting beams as the previous transmitting beams to transmit the information about the transmitting units for one or more transmitting units. The principle and application manner of the repetition indication information in the information about the transmitting units is similar to the repetition indication information in the measurement configuration information of the foregoing transmitting beam group, and details are not described herein again.

Correspondingly, the receiving unit 2310 may receive the beam configuration information transmitted by the base station on the transmitting beam group formed by selecting one transmitting beam from the at least one transmitting unit respectively, according to the beam selection information. The base station may select one transmitting beam in each transmitting unit to form the transmitting beam group according to the beam selection information, or may select one transmitting beam in some of the transmitting units to form the transmitting beam group, which is not limited herein.

As described above with reference to FIG. 17, in the beam selection of the wireless communication method according to one embodiment of the present invention, the base station first transmits the information about the transmitting units, and the information about the transmitting units may include the identification of each transmitting unit and the indication information of the transmitting beams possessed by the transmitting unit. Subsequently, the UE may select the transmitting beams in each transmitting unit according to the information about the transmitting units transmitted by the base station. And, the UE feeds back the selection result to the base station as the beam selection information. In one example, the UE may report the identification of the transmitting unit and the selected transmitting beams at the same time; in another example, considering that the indication information of the transmitting beams is different, the UE may also report only the selected transmitting beams. Optionally, the beam selection information may further include the channel feedback information corresponding to the selected transmitting beams.

Optionally, after receiving the beam selection information fed back by the UE, for different transmitting units, the base station may select one corresponding transmitting beam respectively.

In yet another implementation of the present invention, feedback indication information transmitted by the base station may be received by UE. According to the feedback indication information, transmitting beams corresponding to one or more receiving beams in at least one receiving unit of the user equipment are selected, and the beam selection information is transmitted to the base station, where the beam selection information indicates the transmitting beams selected by the user equipment. The beam selection information may include the identification of the at least one receiving unit and the indication information of the transmitting beams corresponding to one or more receiving beams in the at least one receiving unit. Optionally, the beam selection information may further include the channel feedback information corresponding to the transmitting beams. Specifically, the feedback indication information may include the number of the one or more receiving units to be selected, i.e. to be fed back by the UE, and/or the number of transmitting beams corresponding to the receiving beams of each receiving unit. According to the number, the UE may select one or more receiving beams from different receiving units respectively, and feed the indication information of the transmitting beams corresponding to the selected receiving beams back to the base station, so that the base station may have as many as possible combinations of the transmitting beam groups when obtaining the transmitting beam groups. In one example, the number of the receiving beams and the number of the corresponding transmitting beams selected by the UE according to different receiving units may be the same or different. The number of one or more receiving units fed back by the UE and/or the number of beams selected for different receiving units may be set in advance and known by the UE and the base station, or may be configured by RRC signaling, or may be determined through the parameters such as UE capability information and the number of UE-side transceiver panels/receiving units/spatial filters and the like. For example, the base station may determine the number of one or more receiving units fed back by the UE and/or the number of beams selected for different receiving units, according to the UE capability information, to ensure that the configured number does not exceed the capability of the UE.

Correspondingly, the receiving unit 2310 may receive the beam configuration information transmitted by the base station on the transmitting beam group formed by selecting one transmitting beam from the at least one transmitting unit respectively, according to the beam selection information. The base station may select one transmitting beam in each transmitting unit to form the transmitting beam group according to the beam selection information, or may select one transmitting beam in some of the transmitting units to form the transmitting beam group, which is not limited herein.

Optionally, the receiving units of the UE may be the aforementioned UE, the transceiver panel on the UE, the TXRU on the UE transceiver panel, the radio frequency (RF) filter of the UE, or the spatial filter of the UE, and the like. Each receiving unit of the UE may receive at least one beam at the same time. In one example, the indication information of the transmitting beams corresponding to the receiving beams may indicate the transmitting beams in various ways. For example, the indication information of the transmitting beam may indicate the transmitting beam through one or more of a beam index of the transmitting beam, a resource configuration index of the beam reference signal, and the spatial filters. As described above, the UE may transmit the beam selection information indicating the UE selection result according to a report type preset in, for example, 3GPP R-16, or may also transmit the beam selection information indicating the UE selection result according to the parameters redefined in the existing 3GPP R-15 standard, which will not be repeated here.

By using the UE according to the embodiments of the present invention, it is possible to provide a specific signaling interaction scheme between the base station and the UE when selecting corresponding beams and formed beam groups for different transceiver units, so that the transmission quality of the wireless communication system is improved, the configuration of the channel transmission resources is optimized, and the resource overhead is reduced according to the signaling interaction and the selection process.

The base station according to the embodiments of the present application is described below with reference to FIG. 24. The base station may perform the wireless communication method described above. Since the operation of the base station is basically the same as each step of the information receiving method described above, only a brief description will be given here, and repeated description of the same content will be omitted.

Figure 24:
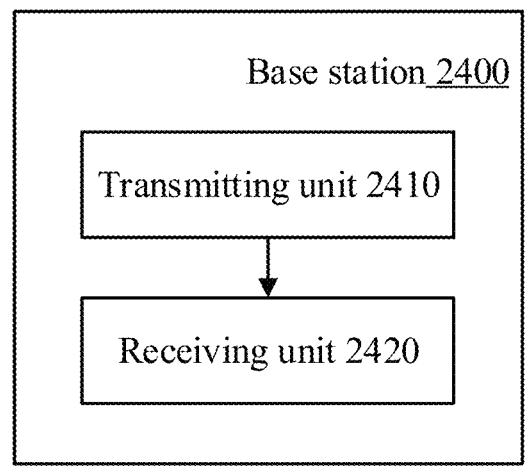
FIG. 24 shows a structural block diagram of a base station according to an embodiment of the present invention.

As shown in FIG. 24, the base station 2400 includes a transmitting unit 2410 and a receiving unit 2420. It should be recognized that FIG. 24 only shows components related to the embodiments of the present application, and other components are omitted, but this is only schematic, and the base station 2400 may include other components according to needs.

The transmitting unit 2410 transmits beam configuration information by using at least one transmitting beam group, where the beam configuration information includes an identification of at least one transmitting beam group and measurement configuration information of at least one transmitting beam group.

The transmitting unit 2410 may select one or more transmitting beam groups from at least one transmitting beam group, and transmit the beam configuration information including the transmitting beam group identification and the measurement configuration information via the selected transmitting beam group. The at least one transmitting beam group may be one or more transmitting beam groups constructed by the beam selection methods described above. As described above, the transmitting beam group in the embodiment of the present invention may be constructed inside the above-mentioned one CSI-ResourceConfig, or may correspond to a plurality of CSI-ResourceConfigs, or may be constructed inside one resourceForChannelMeasurement, or may correspond to a plurality of resourceForChannelMeasurements, which is not limited herein. Optionally, the measurement configuration information of the transmitting beam group may include configuration information (or indication information) of at least one transmitting beam in the transmitting beam group of the base station, where the configuration information of the transmitting beam may indicate the transmitting beam in various ways. in a manner. For example, the indication information of the transmitting beam may indicate the transmitting beam through one or more of a beam index of the transmitting beam, a resource configuration index of a beam reference signal, and the spatial filter.

In an implementation, the measurement configuration information of the transmitting beam group may further include: repetition indication information. In one example, the repetition indication information may correspond to a certain transmitting beam group of the base station, to indicate whether the base station currently uses the same transmitting beam for the transmitting beam group to transmit the beam configuration information. For example, when the repetition indication information is "ON" and corresponds to a transmitting beam group of the base station with an identification 1, the base station may be indicated to use the same transmitting beam currently as previous for the transmitting beam group to transmit the beam configuration information. At this time, the UE may perform a beam scan using a different receiving beam group than before to select a receiving beam group corresponding to the transmitting beam group whose identification is 1. When the repetition indication information is "OFF" and corresponds to the transmitting beam group of the base station with an identification 1, the base station may be indicated not to use the same transmitting beam currently as previous to transmit the beam configuration information for the transmitting beam group. At this time, the UE may keep the same the receiving beam group as before to receive the beam configuration information, and select the transmitting beam group corresponding to the receiving beam group.

In another example, the repetition indication information may correspond to one or more transmitting units of the base station, to indicate whether the base station currently uses the same transmitting beam (or spatial filter) as previous for the one or more transmitting units to transmit the beam configuration information. For example, when the repetition indication information is "ON" and corresponds to a transmitting unit 1 of the base station, the base station may be indicated to use the same transmitting beam 1 currently as previous for the transmitting unit 1 to transmit the beam configuration information. At this time, for the transmitting unit 1, the UE may perform the beam scan using a different receiving beam group than before to select a receiving beam group corresponding to the transmitting beam 1. When the repetition indication information is "OFF" and corresponds to the transmitting unit 1 of the base station, the base station may be indicated to currently use a transmitting beam 2 different from the previous transmitting beam 1 to transmit the beam configuration information. At this time, the UE may keep the same the receiving beam group as before to receive for comparison, and select the transmitting beam corresponding to the receiving beam group.

Optionally, the repetition indication information may use a value of one bit to indicate different states of "ON" or "OFF" thereof. For example, a bit with a value of 1 may be used to indicate "ON", and a bit with a value of 0 may be used to indicate "OFF"; conversely, a bit with a value of 0 may be used to indicate "ON", and a bit with a value of 1 may be used to indicate "OFF". The above various descriptions of the repetition indication information are merely examples. In practical applications, any representation manner of the repetition indication information may be adopted to represent the repetition of the transmitting beam group and/or the transmitting beam, which is not limited herein.

In one implementation, the beam configuration information transmitted by the base station may further include: the number of transmitting beam groups that the base station needs to receive the feedback information from user equipment; accordingly, the user equipment may feed the feedback information back according to a quantity defined by the beam configuration information. For example, the beam configuration information transmitted by the base station may include: the feedback information of 3 transmitting beam groups that need to be received from the user equipment, so that even if the user equipment receives beam configuration information transmitted by, for example, 5 transmitting beam groups, it is also possible to feed back only the feedback information corresponding to a maximum of three transmitting beam groups. As described above, the transmit beam group for feedback may be selected in different ways, which will not be repeated it here. Of course, the above feedback manners of the feedback information are only examples. In practical applications, the number of transmitting beam groups that the base station needs to receive the feedback information from the user equipment may be greater than, equal to, or less than the number of transmitting beam groups for transmitting the beam configuration information, which is not limited herein.

In one implementation, the measurement configuration information of the transmitting beam group may include a channel quality type measured by the user equipment, and thus, the user equipment may obtain feedback information of a corresponding type of channel quality according to the channel quality type. The type of the channel quality measured by the user equipment and indicated by the base station may be, for example, RSRQ, RSRP, SINR, RSSI, and the like. In one example, the type of channel quality measured by the user equipment and indicated by the base station may be RSRQ. In another example, the type of channel quality measured by the user equipment and indicated by the base station may be RSRP, for example, it may be an average RSRP corresponding to the transmitting beam group. In another example, the type of channel quality measured by the user equipment and indicated by the base station may be SINR, for example, it may be an average SINR corresponding to the transmitting beam group. Accordingly, in one example, the measurement configuration information of the transmitting beam group may further include measurement configuration information for indicating one or more reference signal strength measurements, for example, the measurement configuration information of the transmitting beam group may include the measurement configuration information of one or more CSI-RS strength measurements, or the measurement configuration information of one or more SSB strength measurements. In another example, the measurement configuration information of the transmitting beam group may further include: the measurement configuration information of RSSI corresponding to one or more CSI-RSs or SSBs and/or the measurement configuration information of interference strength.

The receiving unit 2420 receives feedback information on channel quality fed back by the user equipment according to the beam configuration information.

In one implementation of the present invention, when the beam configuration information transmitted by the transmitting unit 2410 includes the number of transmit beam groups that the base station needs to receive the feedback information from the user equipment, the user equipment may feed back the feedback information according to the quantity defined by the beam configuration information.

In one implementation manner of the present invention, when the measurement configuration information of the transmitting beam group transmitted by the transmitting unit 2410 includes the channel quality type measured by the user equipment, the user equipment may obtain the feedback information of a corresponding channel quality type according to the channel quality type. As described above, the type of channel quality measured by the user equipment and indicated by the base station may be, for example, RSRQ, RSRP, SINR, RSSI, and the like.

In one example, the type of channel quality measured by the user equipment and indicated by the transmitting unit 2410 may be RSRP. Specifically, the UE may, for example, measure reference signal resource elements (REs) of one or more CSI-RSs or SSBs based on the measurement configuration information of the transmitting beam group transmitted by the base station, to obtain an average L1-RSRP corresponding to the transmitting beam group as the feedback information about the channel quality.

In another example, the type of channel quality measured by the user equipment and indicated by transmitting unit 2410 may be RSRQ, for example, it may be an average RSRQ corresponding to the transmitting beam group. Specifically, the UE may obtain an average L1-RSRQ of the transmitting beam group based on the measurement configuration information of the transmitting beam group, for example, according to the L1-RSRQ obtained by measuring each reference signal configured in the transmitting beam group. For example, when the measurement configuration information of the transmitting beam group indicates that two reference signals are measured, an average value of a first L1-RSRQ and a second L1-RSRQ obtained may be used to obtain the average L1-RSRQ of the transmitting beam group. The L1-RSRQ of each reference signal may be obtained by measuring the strength of the reference signal and measuring the RSSI. At this time, the measurement configuration information of the transmitting beam group may include measurement configuration information for indicating a reference signal strength measurement. For example, the measurement configuration information of the transmitting beam group may include measurement configuration information indicating CSI-RS strength measurement, or measurement configuration information indicating SSB strength measurement. In addition, optionally, the RSSI may be a total energy strength received on reference signal resource elements or resource elements over an entire bandwidth of a time symbol where the reference signal resource elements are located, or a reference signal configuration of a plurality of reference signal configurations within the transmitting beam group may be received as the interference strength measurement configuration of the reference signal using the same receiving beam. For example, the measurement configuration information of the transmitting beam group may also be explicitly configured with: the measurement configuration information of the receiving signal strength indication of at least one transmitting beam in the transmitting beam group and/or the measurement configuration information of the interference strength. Accordingly, the feeding back the channel quality feedback information according to the beam configuration information may include: obtaining a reference signal received quality of the transmitting beam group according to the measurement configuration information of the receiving signal strength indication and/or the measurement configuration information of the interference strength. For another example, the feeding back of the channel quality feedback information according to the beam configuration information may further include: obtaining the reference signal received quality of the transmitting beam group according to a preset configuration. The preset configuration may be configured implicitly. In one example, the preset configuration of the reference signal received quality corresponding to the transmitting beam group obtained according to the receiving signal strength indication and/or the interference strength may be pre-configured on both sides of the UE and the base station; it may also be pre-configured to the base station and notified to the UE in advance through signaling; or it may be pre-configured to the UE and reported to the base station through signaling. The measurement configuration information content and various preset configuration methods described above are merely examples. In practical applications, the any measurement configuration information content and preset configuration methods may be adopted, and are not limited herein.

In yet another example, the type of channel quality measured by the user equipment and indicated by the transmitting unit 2410 may be SINR, for example, it may be an average SINR corresponding to the transmitting beam group. Specifically, the UE may obtain an average L1-SINR of the transmitting beam group based on the measurement configuration information of the transmitting beam group, for example, according to the L1-SINR obtained by measuring each reference signal configured in the transmitting beam group. For example, when the measurement configuration information of the transmitting beam group indicates that two reference signals are measured, an average value of a first L1-SINR and a second L1-SINR obtained may be used to obtain the average L1-SINR of the transmitting beam group. The L1-SINR of each reference signal may be obtained by measuring the strength of the reference signal and measuring the interference strength. At this time, the measurement configuration information of the transmitting beam group may include measurement configuration information for indicating one or more (for example, two) reference signal strength measurements. For example, the measurement configuration information of the transmitting beam group may include measurement configuration information indicating CSI-RS strength measurement, or measurement configuration information indicating SSB strength measurement. For example, the measurement configuration information of the transmitting beam group may also be explicitly configured with: the measurement configuration information of the interference strength; correspondingly, feeding back the feedback information about the channel quality according to the beam configuration information may include: obtaining a signal-to-interference and noise ratio of the transmitting beam group according to the measurement configuration information of the interference strength. For another example, the feeding back of the channel quality feedback information according to the beam configuration information may further include: obtaining the signal-to-interference and noise ratio of the transmitting beam group according to a preset configuration. The preset configuration may be configured implicitly. In one example, the preset configuration of the signal-to-interference and noise ratio corresponding to the transmitting beam group obtained according to the interference strength may be pre-configured on both sides of the UE and the base station; it may also be pre-configured to the base station and notified to the UE in advance through signaling; or it may be pre-configured to the UE and reported to the base station through signaling. For example, as an example of an implicit configuration, it may be configured such that the interference corresponding to a certain reference signal in the transmitting beam group may be measured by measuring the interference received on the reference signal resource elements, or the interference received on the entire bandwidth of the time symbol where the reference signal resource elements are located, or by receiving the interference at the position of another reference signal element within the transmitting beam group using the same receiving beam. The measurement configuration information content and various preset configuration methods described above are merely examples. In practical applications, the any measurement configuration information content and preset configuration methods may be adopted, and are not limited herein.

The UE may measure the reference signal strength in the manner described above with reference to FIG. 14. Alternatively, the UE may measure the reference signal strength and the interference strength in the manner described above with reference to FIG. 15. Alternatively, the UE may measure the reference signal strength and the receiving signal strength indication in the manner described above with reference to FIG. 16. Thereby, a channel quality measurement result of the transmitting beam group of the base station may be obtained, and the result is fed back to the base station.

In the embodiment of the present invention, after receiving the feedback information, the base station may select one or more transmitting beam groups among the at least one transmitting beam group according to the received feedback information on channel quality. Specifically, the feedback information may be associated with one or more transmitting beam groups in the at least one transmitting beam group, so that the feedback information may further include an identification of the one or more transmitting beam groups. For example, the feedback information reported by the UE may include, for example, an identification 1 of the transmitting beam group and its corresponding channel quality feedback information. As described above, the type of channel quality measured by the user equipment and indicated by the base station may be, for example, RSRQ, RSRP, SINR, RSSI, and so the like. In one example, the feedback information fed back by the UE may include one or more of the following feedback information: transmitting beam group identification_RSRP (or, CSI_transmitting beam group identification_RSRP and/or SSB_transmitting beam group identification_RSRP), transmitting beam group identificatio)_RSRQ/SINR (or, CSI_transmitting beam group identification_RSRQ/SINR and/or SSB_transmitting beam group identification_RSRQ/SINR. Here, RSRQ means user feedback RSRQ, SINR means user feedback SINR, RSRQ/SINR means one or all of user feedback RSRQ and SINR), transmitting beam group identification_ RSRP_RSRQ/SINR (or, CSI_transmitting beam group identification_RSRP_RSRQ/SINR and/or SSB_transmitting beam group identification_RSRP_RSRQ/SINR. Here, RSRP_RSRQ means that the user feeds back both RSRP and RSRQ simultaneously). The above feedback information of the UE is only an example. In practical applications, the UE may use any feedback information about the channel quality obtained according to the beam configuration information for feedback, which is not limited herein. In addition, when the user feeds back the signal quality measurement results RSRQ, RSRP, SINR, or RSSI of a plurality of transmitting beam groups, a plurality of absolute values of these results may be fed back, or the absolute channel quality measurement results may be fed back for the optimal transmitting beam group (for example, the transmitting beam group with the best channel quality), while the relative difference to the absolute channel quality measurement results of the optimal transmitting beam group are fed back for other transmitting beam groups.

The base station according to the embodiments of the present invention are described above. In another implementation of the present invention, information about the transmitting units may also be transmitted by the base station, where the information about the transmitting units indicates an identification of at least one transmitting unit and the indication information of the transmitting beams possessed by the at least one transmitting unit, such that the user equipment selects one or more transmitting beams in the at least one transmitting unit according to the information about the transmitting units and feeds back beam selection information indicating the user equipment selection result. The beam selection information may include the identification of the at least one transmitting unit, indication information of the transmitting beams selected in the transmitting unit, and/or channel feedback information corresponding to the selected transmitting beams. Specifically, according to the information transmitted by the base station about the transmitting unit, the base station may let the UE know about the number of transmitting units of the base station, the identifications of the transmitting units, and the possessed transmitting beams, so that the UE may select one or more transmitting beams from different transmitting units separately for feedback to the base station, thereby avoiding the situation that the UE cannot feed back the transmitting beam to the base station according to a division of the transmitting beams by the transmitting units when the UE does not know the correspondence between the transmitting units and the corresponding transmitting beams, so that the base station may have as many as possible combination schemes of the transmitting beam groups when determining the transmitting beam group in step S2201.

Optionally, the transmitting units of the base station may be the aforementioned base station, the transceiver panel on the base station, the TXRU on the transceiver panel of the base station, the radio frequency (RF) filter of the base station, or the spatial filter of the base station. The transmitting units of the base station may each transmit at least one transmitting beam simultaneously. In one example, the indication information of the transmitting beam may indicate the transmitting beam in various ways. For example, the indication information of the transmitting beam may indicate the transmitting beam through one or more of a beam index of the transmitting beam, a resource configuration index of the beam reference signal, and the spatial filters. Furthermore, the indication information of the transmitting beams possessed by one transmitting unit of the base station may be constructed inside one CSI-ResourceConfig shown in FIG. 11, or correspond to a plurality of CSI-ResourceConfigs, or may be constructed inside one resourceForChannelMeasurement, or correspond to a plurality of resourceForChannelMeasurements, and there is no limitation herein. Optionally, the indication information of the transmitting beams possessed by the at least one transmitting unit may further include the number of transmitting beams that the UE is desired to select for one or more transmitting units in the at least one transmitting unit, where the number of transmitting beams (or the maximum number of transmitting beams to be selected) to be selected by the UE may be configured for different transmitting units, and these numbers may be the same or different.

Furthermore, optionally, the information about the transmitting units may also include: repetition indication information, which is used to indicate whether the base station currently uses the same transmitting beams as the previous transmitting beams to transmit the information about the transmitting units for one or more transmitting units. The principle and application manner of the repetition indication information in the information about the transmitting units is similar to the repetition indication information in the measurement configuration information of the foregoing transmitting beam group, and details are not described herein again.

Correspondingly, the transmitting unit 2410 may select one transmitting beam respectively among at least one transmitting unit to form the beam configuration information of the transmitting beam groups according to the beam selection information fed back by the user equipment. The base station may select one transmitting beam in each transmitting unit to form the transmitting beam group according to the beam selection information, or may select one transmitting beam in some of the transmitting units to form the transmitting beam group, which is not limited herein.

In addition, as described above with reference to FIG. 17, in the beam selection of the wireless communication method according to one embodiment of the present invention, the base station first transmits the information about the transmitting units, and the information about the transmitting units may include the identification of each transmitting unit and the indication information of the transmitting beams possessed by the transmitting unit. Subsequently, the UE may select the transmitting beams in each transmitting unit according to the information about the transmitting units transmitted by the base station. And, the UE feeds back the selection result to the base station as the beam selection information. In one example, the UE may report the identification of the transmitting unit and the selected transmitting beams at the same time; in another example, considering that the indication information of the transmitting beams is different, the UE may also report only the selected transmitting beams. Optionally, the beam selection information may further include the channel feedback information corresponding to the selected transmitting beams.

Optionally, after receiving the beam selection information fed back by the UE, for different transmitting units, the base station may select one corresponding transmitting beam respectively.

In another implementation manner of the present invention, the base station may also transmit feedback indication information to the user equipment, and receive beam selection information indicating the user equipment selection result transmitted by the user equipment through the receiving unit (not shown). The beam selection information indicates the transmitting beams corresponding to one or more receiving beams in at least one receiving unit of the user equipment selected by the user equipment according to the feedback indication information. The feedback indication information may include the number of the one or more receiving units to be selected, i.e. to be fed back by the UE, and/or the number of transmitting beams corresponding to the receiving beams of each receiving unit. The beam selection information may include the identification of the at least one receiving unit and the indication information of the transmitting beams corresponding to one or more receiving beams in the at least one receiving unit. Optionally, the beam selection information may further include the channel feedback information corresponding to the transmitting beams. Specifically, the UE may select one or more receiving beams according to different receiving units respectively, and feed the indication information of the transmitting beams corresponding to the selected receiving beams back to the base station, so that the base station may have as many as possible combinations of the transmitting beam groups when determining the corresponding transmitting beam groups in step S2201. In one example, the number of the receiving beams selected by the UE according to different receiving units and the number of the corresponding transmitting beams may be the same or different. For example, for each receiving unit, the UE may select 2 transmitting beams; for another example, for one receiving unit, the UE may select one transmitting beam, and for another receiving unit, the UE may select 3 transmitting beams. The number of one or more receiving units fed back by the UE and/or the number of beams selected by the UE for different receiving units may be set in advance and known by the UE and the base station, or may be configured by RRC signaling, or may be determined through the parameters such as UE capability information and the number of UE-side transceiver panels/receiving units/spatial filters and the like. For example, the base station may determine the number of one or more receiving units fed back by the UE and/or the number of transmitting beams selected for different receiving units, according to the UE capability information, to ensure that the configured number does not exceed the capability of the UE.

Correspondingly, the transmitting unit 2410 may select one transmitting beam from the at least one transmitting unit respectively to form the beam configuration information transmitted by the transmitting beam group, according to the beam selection information transmitted by the user equipment. The base station may select one transmitting beam in each transmitting unit to form the transmitting beam group according to the beam selection information, or may select one transmitting beam in some of the transmitting units to form the transmitting beam group, which is not limited herein.

Optionally, the receiving units of the UE may be the aforementioned UE, the transceiver panel on the UE, the TXRU on the UE transceiver panel, the radio frequency (RF) filter of the UE, or the spatial filter of the UE, and the like. Each receiving unit of the UE may receive at least one beam at the same time. In one example, the indication information of the transmitting beams corresponding to the receiving beams may indicate the transmitting beams in various ways. For example, the indication information of the transmitting beam may indicate the transmitting beam through one or more of a beam index of the transmitting beam, a resource configuration index of the beam reference signal, and the spatial filters. As described above, the UE may transmit the beam selection information indicating the UE selection result according to a report type preset in, for example, 3GPP R-16, or may also transmit the beam selection information indicating the UE selection result according to the parameters redefined in the existing 3GPP R-15 standard, which will not be repeated here.

By using the base station according to the embodiments of the present invention, it is possible to provide a specific signaling interaction scheme between the base station and the UE when selecting corresponding beams and formed beam groups for different transceiver units, so that the transmission quality of the wireless communication system is improved, the configuration of the channel transmission resources is optimized, and the resource overhead is reduced according to the signaling interaction and the selection process.

<Hardware Structure>

Figure 25:
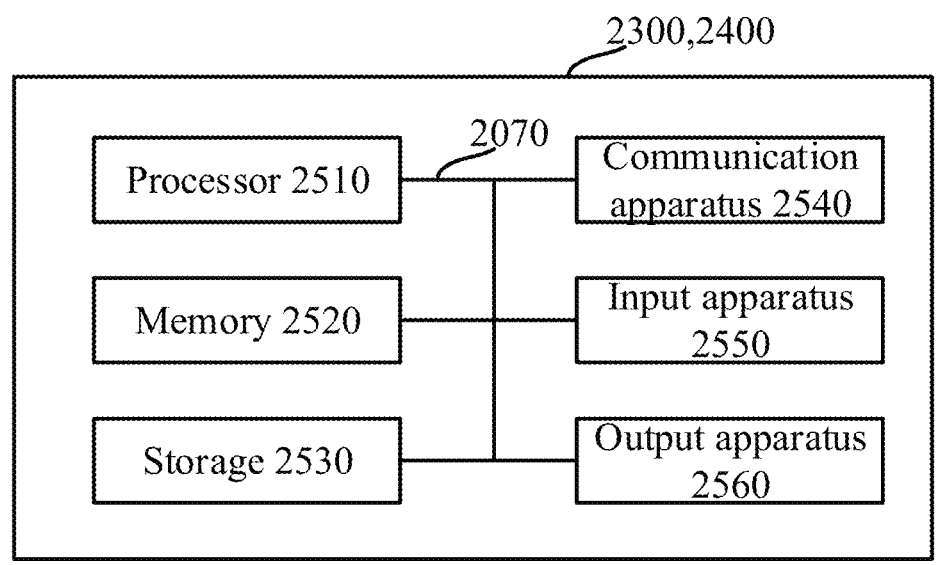
FIG. 25 shows a diagram of an example of a hardware structure of a user equipment and a base station involved in an embodiment of the present invention.

For example, the transmitting equipment and the receiving equipment, and the like in the embodiment of the present invention may function as a computer that executes processing of the wireless communication method of the present invention. FIG. 25 is a diagram illustrating an example of a hardware configuration of a related user equipment and base station according to an embodiment of the present invention. The user equipment 2300 and base station 2400 described above may be physically designed as a computer apparatus including a processor 2510, a memory 2520, a storage 2530, a communication apparatus 2540, an input apparatus 2550, an output apparatus 2560, and a bus 2570 and the like.

It should be noted that, in the following description, the word "apparatus" may be replaced by "circuit", "device", "unit" and so on. It should be noted that the hardware structure of the user equipment 2300 and the base station 2400 may be designed to include one or more of each apparatus shown in the drawings, or may be designed not to include part of the apparatus.

For example, although only one processor 2510 is shown, a plurality of processors may be provided. Furthermore, processes may be implemented with one processor, or processes may be implemented either simultaneously or in sequence, or in different manners, on two or more processors. It should be noted that the processor 2510 may be implemented with one or more chips.

Each function of the user equipment 2300 and the base station 2400 is implemented by reading predetermined software (program) on hardware such as the processor 2510 and the memory 2520, so as to make the processor 2510 perform calculations, and by controlling the communication carried out by the communication apparatus 2540, and the reading and/or writing of data in the memory 2520 and the storage 2530.

The processor 2510 may control the whole computer by, for example, running an operating system. The processor 2510 may be configured with a central processing unit (CPU), which includes interfaces with peripheral apparatus, control apparatus, computing apparatus, a register and so on.

Furthermore, the processor 2510 reads programs (program codes), software modules or data, from the storage 2530 and/or the communication apparatus 2540, into the memory 2520, and executes various processes according to these. As for the programs, programs to allow computers to execute at least part of the operations of the above-described embodiments may be used.

The memory 2520 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 2520 may be referred to as a "register", a "cache", a "main memory" (primary storage apparatus) and so on. The memory 2520 may store executable programs (program codes), software modules and so on for implementing the wireless communication methods according to embodiments of the present invention.

The storage 2530 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 2530 may be referred to as "secondary storage apparatus."

The communication apparatus 2540 is hardware (transmitting/receiving device) for allowing inter-computer communication by using wired and/or wireless networks, and may be referred to as, for example, a "network device", a "network controller", a "network card", a "communication module" and so on. The communication apparatus 2540 may be configured to include a high frequency switch, a duplexer, a filter, a frequency synthesizer and so on in order to realize, for example, frequency division duplex (FDD) and/or time division duplex (TDD).

The input apparatus 2550 is an input device for receiving input from the outside (for example, a keyboard, a mouse, a microphone, a switch, a button, a sensor and so on). The output apparatus 2560 is an output device for allowing sending output to the outside (for example, a display, a speaker, an LED (Light Emitting Diode) lamp and so on). It should be noted that the input apparatus 2550 and the output apparatus 2560 may be provided in an integrated structure (for example, a touch panel).

Furthermore, these pieces of apparatus, including the processor 2510, the memory 2520 and so on are connected by the bus 2570 so as to communicate information. The bus 2570 may be formed with a single bus, or may be formed with buses that vary between pieces of apparatus.

Also, the user equipment 2300 and the base station 2400 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 2510 may be installed with at least one of these pieces of hardware.

<Variations>

In addition, it should be noted that the terms illustrated in the present specification and/or the terms required for the understanding of the present specification may be substituted with terms having the same or similar meaning. For example, a channel and/or a symbol may be a signal. In addition, the signal may be a message. A reference signal may be abbreviated as an "RS (Reference Signal)", and may be referred to as a "pilot", a "pilot signal" and so on, depending on which standard applies. In addition, a component carrier (CC) may be referred to as a carrier frequency, a cell, or the like.

In addition, the wireless frame may be composed of one or more periods (frames) in the time domain. Each of the one or more periods (frames) constituting the wireless frame may also be referred to as a subframe. Further, a subframe may be composed of one or more slots in the time domain. The subframe may be a fixed length of time duration (e.g., 1 ms) that is independent of the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Furthermore, the slot may also be a time unit configured based on parameter. Furthermore, a slot may also include multiple minislots. Each minislot may be comprised of one or more symbols in the time domain. Furthermore, a minislot may also be referred as "a subframe".

A wireless frame, a subframe, a slot, a minislot and a symbol all represent the time unit when transmitting signals. A wireless frame, a subframe, a slot, a minislot and a symbol may also use other names that correspond to each other. For example, one subframe may be referred to as a "transmission time interval (TTI)", and a plurality of consecutive subframes may also be referred to as a "TTI", and one slot or one minislot may also be referred to as a "TTI." That is, a subframe and/or a TTI may be a subframe (1 ms) in existing LTE, may be a shorter period than 1 ms (for example, one to thirteen symbols), or may be a longer period of time than 1 ms. It should be noted that a unit indicating a TTI may also be referred to as a slot, a minislot, or the like instead of a subframe.

Here, a TTI refers to the minimum time unit of scheduling in wireless communication, for example. For example, in LTE systems, a wireless base station schedules the wireless resources (such as the frequency bandwidth and transmission power that may be used in each user terminal) to allocate to each user terminal in TTI units. It should be noted that the definition of TTIs is not limited to this.

TTIs may be channel-coded data packets (transport blocks), code blocks, and/or codeword transmission time units, or may be the unit of processing in scheduling, link adaptation and so on. It should be noted that, when a TTI is given, the time interval (e.g., the number of symbols) actually mapped to the transport block, code block, and/or codeword may also be shorter than the TTI.

It should be noted that, when one slot or one minislot is called a TTI, more than one TTI (i.e., more than one slot or more than one minislot) may also become the scheduled minimum time unit. Furthermore, the number of slots (the number of minislots) constituting the minimum time unit of the scheduling may be controlled.

A TTI having a time duration of 1 ms may be referred to as a "normal TTI" (TTI in LTE Rel. 8 to 12), a "standard TTI", a "long TTI", a "normal subframe", a "standard subframe", or a "long subframe", and so on. A TTI that is shorter than a normal TTI may be referred to as a "shortened TTI", a "short TTI", a "partial (or fractional) TTI", a "shortened subframe", a "short subframe", a "minislot", or a "short minislot" and so on.

It should be noted that, a long TTI (eg, a normal TTI, a subframe, etc.) may be replaced with a TTI having a time duration exceeding 1 ms, and a short TTI (eg, a shortened TTI, and so on) may also be replaced with a TTI having a TTI duration shorter than the long TTI and a TTI duration exceeding 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI duration. One TTI and one subframe each may be comprised of one or more resource blocks, respectively. It should be noted that one or more RBs may also be referred to as a "physical resource block (PRB (Physical RB))", a "SubCarrier Group (SCG)", a "Resource Element Group (REG)", a "PRG pair", an "RB pair" and so on.

Also, a resource block may also be composed of one or more resource elements (RE). For example, one RE can be a wireless resource area of a subcarrier and a symbol.

It should be noted that the above-described structures of wireless frames, subframes, slots, minislots and symbols and so on are simply examples. For example, configurations such as the number of subframes included in a wireless frame, the number of slots of each subframe or wireless frame, the number or minislots included in a slot, the number of symbols and RBs included in a slot or minislot, the number of subcarriers included in an RB, the number of symbols in a TTI, the symbol duration and the cyclic prefix (CP) duration can be variously changed.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on that are input and/or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, a reporting "X") does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, the terms "radio base station (BS)", "radio base station", "eNB", "gNB", "cell", "sector", "cell group", "carrier" and "component carrier" may be used interchangeably. A radio base station may be referred to as a "fixed station", "NodeB", "eNodeB (eNB)", "access point", "transmission point", "receiving point", "femto cell", "small cell" and so on.

A radio base station can accommodate one or more (for example, three) cells (also referred to as "sectors"). When a radio base station accommodates a plurality of cells, the entire coverage area of the radio base station can be partitioned into a plurality of smaller areas, and each smaller area can provide communication services with radio base station subsystems (for example, indoor small radio base stations (RRHs (Remote Radio Heads))). The term "cell" or "sector" refers to part or all of the coverage area of a radio base station and/or a radio base station subsystem that provides communication services within this coverage.

In the present specification, the terms "mobile station (MS)", "user terminal", "user equipment (UE)" and "terminal" may be used interchangeably. The radio base station is sometimes referred to by terms such as a fixed station, a NodeB, a eNodeB (eNB), an access point, an transmitting point, a receiving point, a femto cell, and small cell, and the like.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, both the user equipment 2300 and the base station 2400 in this specification may be replaced with the wireless base stations or user terminals.

In the present specification, it is assumed that certain actions to be performed by radio base station may, in some cases, be performed by its higher node (upper node). In a network comprised of one or more network nodes with base stations, it is clear that various operations that are performed to communicate with terminals can be performed by radio base stations, one or more network nodes (for example, MMEs (Mobility Management Entities), S-GW (Serving-Gateways), and so on may be possible, but these are not limiting) other than radio base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000 (Code Division Multiple Access), UMB (Ultra Mobile Broadband), IEEE 802.11 (Wi-Fi (registered trademark)), IEEE 802.16 (WiMAX (registered trademark)), IEEE 920.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention may be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A wireless communication method performed by a user equipment, comprising:
    receiving configuration information related to a plurality of reference signal groups, the configuration information indicating measurement configuration information related to the plurality of reference signal groups;
    receiving reference signals from the plurality of reference signal groups;
    performing measurement based on received reference signals according to the measurement configuration information; and
    transmitting feedback information about channel quality,
    wherein the configuration information further includes feedback configuration information about the feedback information,
    wherein, the feedback information includes one or more feedback information groups, each of the feedback information groups including reference signal information related to a reference signal of each of the plurality of reference signal groups, and
    wherein, reference signals related to all the reference signal information in the feedback information group can be simultaneously received by the user equipment.

2. The method of claim 1, wherein the feedback information includes information indicating at least one of the following:
    a relationship between the plurality of reference signal groups and one or more reference signals therein, and
    a relationship between the plurality of reference signal groups and the channel quality of one or more reference signals therein.

3. The method of claim 1, wherein the feedback configuration information indicates the number of the feedback information groups in the feedback information.

4. The method of claim 1, wherein the measurement configuration information indicates that the feedback information about the channel quality is the feedback information about reference signal received power.

5. A user equipment comprising:
    a receiver configured to receive configuration information related to a plurality of reference signal groups, and receive reference signals from the plurality of reference signal groups, wherein the configuration information indicates measurement configuration information related to the plurality of reference signal groups;
    a processor configured to perform measurement based on received reference signals according to the measurement configuration information; and
    a transmitter configured to transmit feedback information about channel quality,
    wherein the configuration information further includes feedback configuration information about the feedback information,
    wherein, the feedback information includes one or more feedback information groups, each of the feedback information groups including reference signal information related to a reference signal of each of the plurality of reference signal groups, and
    wherein, reference signals related to all the reference signal information in the feedback information group can be simultaneously received by the user equipment.

* * * * *